US012662968B2

(12) United States Patent
Labastida Ponce et al.

(10) Patent No.: US 12,662,968 B2
(45) Date of Patent: Jun. 23, 2026

(54) TURBINE ENGINE HAVING AN ENGINE CORE AND A BLEED AIR CONDUIT

(71) Applicant: GENERAL ELECTRIC COMPANY, Evendale, OH (US)

(72) Inventors: Cesar Antonio Labastida Ponce, Querétaro (MX); Apolinario Barra Ruiz, Querétaro (MX)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/915,727

(22) Filed: Oct. 15, 2024

(65) Prior Publication Data

US 2025/0243816 A1 Jul. 31, 2025

Related U.S. Application Data

(60) Provisional application No. 63/627,503, filed on Jan. 31, 2024.

(51) Int. Cl.
| | |
|---|---|
| *F02C 9/18* | (2006.01) |
| *F02C 6/08* | (2006.01) |
| *F02C 7/057* | (2006.01) |
| *F02C 7/25* | (2006.01) |

(52) U.S. Cl.
CPC .................. *F02C 9/18* (2013.01); *F02C 6/08* (2013.01); *F02C 7/057* (2013.01); *F02C 7/25* (2013.01); *F05D 2260/608* (2013.01)

(58) Field of Classification Search
CPC ... F16L 19/0206; F16L 19/0237; F16L 55/07; F02C 7/05; F02C 7/052; F02C 9/18; F02C 7/25; F02C 7/057; Y10T 137/5762
See application file for complete search history.

(56) References Cited

U.S. PATENT DOCUMENTS

| | | | |
|---|---|---|---|
| 3,078,450 A | 2/1963 | Bressler | |
| 4,424,989 A * | 1/1984 | Spencer .................. | F16L 55/07 |
| | | | 138/40 |
| 7,266,986 B2 | 9/2007 | Shirley et al. | |
| 10,012,318 B2 | 7/2018 | Morgan et al. | |
| 10,401,229 B2 | 9/2019 | Anderson et al. | |
| 10,564,060 B2 | 2/2020 | Schofield | |
| 11,105,691 B2 | 8/2021 | Gordon et al. | |
| 11,540,662 B2 | 1/2023 | Devlin et al. | |
| 11,708,795 B1 * | 7/2023 | Mastrocola ............. | F02C 7/236 |
| | | | 60/39.281 |
| 12,140,088 B1 * | 11/2024 | Perera ................... | F04D 27/001 |
| 2001/0045088 A1 * | 11/2001 | Sugitani ................... | F02C 9/28 |
| | | | 60/39.281 |

FOREIGN PATENT DOCUMENTS

GB 1043081 9/1966

* cited by examiner

*Primary Examiner* — Rodolphe Andre Chabreyrie
(74) *Attorney, Agent, or Firm* — Wood Herron & Evans LLP

(57) ABSTRACT

A turbine engine has an engine core, a fan section, a bleed air conduit, and a drain assembly. The engine core has a compressor section, combustor section, and turbine section in serial flow arrangement and defining a stator, rotor, and a fire zone. The fan section is rotationally coupled to the rotor. The bleed air conduit is fluidly coupled to at least one of the fan section or the compressor section and having a gravitational low point within the fire zone. The drain assembly is provided along the bleed air conduit.

20 Claims, 10 Drawing Sheets

TURBINE ENGINE HAVING AN ENGINE CORE AND A BLEED AIR CONDUIT

CROSS REFERENCE TO RELATED APPLICATIONS

This application claims priority to U.S. Provisional Patent No. 63/627,503, filed Jan. 31, 2024, which is hereby incorporated by reference in its entirety.

TECHNICAL FIELD

The disclosure generally relates to a turbine engine having an engine core, and more specifically to a bleed air conduit of the turbine engine.

BACKGROUND

Turbine engines, and particularly gas or combustion turbine engines, include a compressor section, a combustion section and a turbine section defining an engine core. Turbine engines are rotary engines that extract energy from a flow of gases passing through a fan section having a plurality of fan blades, then into a compressor section having pairs of rotating blades and stationary vanes, through a combustion section, and then through a turbine section having pairs of rotating blades and stationary vanes. The blades are mounted to rotating disks, while the vanes are mounted to stator disks. The compressor section, the combustion section and the turbine section are collectively referred to as an engine core. At least a portion of the engine core is classified as a designated fire zone per 14 CFR Part 25. As used herein, "fire zone(s)" are areas or compartments of the turbine engine that are exterior the engine core but susceptible to a fire if an ignition were to occur in the zone. The turbine engine includes additional designated zones such as a "flammable fluid leakage zones" (FFLZ). A FFLZ is a portion of the turbine engine where it has been demonstrated that there are no ignition sources for a flammable fluid during operation of the turbine engine (e.g., during flight, takeoff, failure, etc.). It will be appreciated that the FFLZ is exterior the fire zone.

Bleed air is drawn from upstream sections of the turbine engine (e.g., the fan section, the compressor section, or a combination thereof) and fed to downstream sections of the turbine engine or auxiliary systems of the turbine engine. Bleed air can be drawn from sections of the turbine engine to determine a pressure, velocity, temperature of combination thereof of the working airflow that is flowing through a respective portion of the turbine engine that the bleed air is drawn from. An engine controller can be used to control the supply of or otherwise measure the temperature, velocity, pressure, or a combination thereof of the bleed air.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
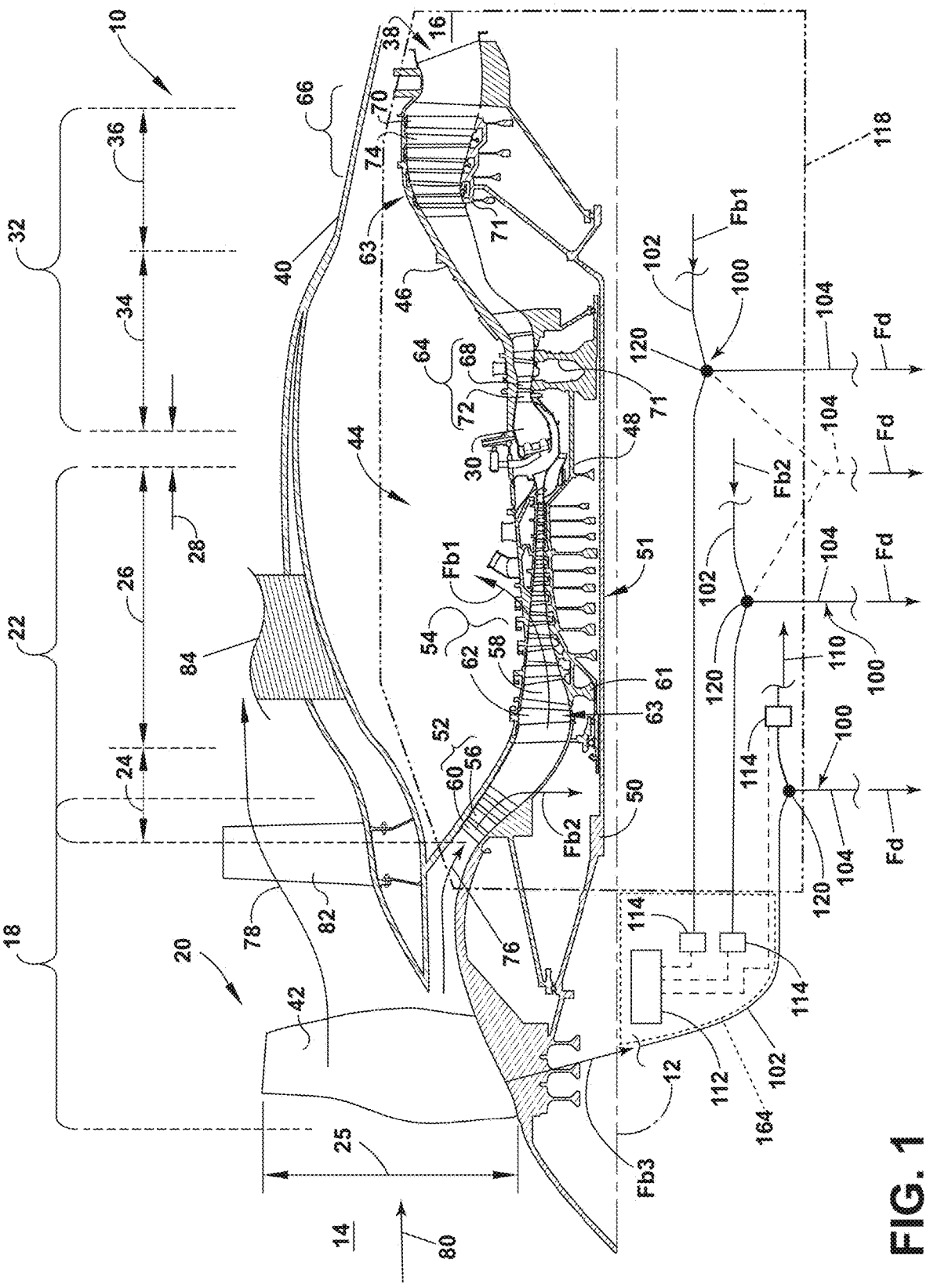
FIG. 1 is a schematic cross-sectional view of an unducted turbine engine including a set of bleed air conduits and set of drain assemblies, in accordance with an exemplary embodiment of the present disclosure.

Aspects of the disclosure are directed to a turbine engine having a fire zone and an FFLZ. The turbine engine has an engine controller, a bleed air conduit, and a drain assembly. The engine controller is configured to measure at least one of a flow rate (e.g., velocity) of a flow of bleed air within the bleed air conduit, a temperature of a flow of bleed air within the bleed air conduit, a pressure of a flow of bleed air within the bleed air conduit, or a combination thereof. The drain assembly includes a drain conduit, a weep hole, and a junction fitting. As used herein, the term "fitting" refers to a physical component including a body defining at least one internal passage extending through the body. The drain assembly is provided along the bleed air conduit. The junction fitting fluidly couples the drain conduit to the bleed air conduit.

At least a portion of the drain assembly is provided within the fire zone of the turbine engine. The engine controller is provided within the FFLZ. The drain assembly gathers moisture (e.g., condensation) from within the bleed air conduit. The gathered moisture is then drained exterior the fire zone and exhausted exterior the fire zone through the drain assembly. The moisture is gathered prior to the bleed air entering the FFLZ. Specifically, the moisture is gathered prior to the bleed air entering where the engine controller is coupled to (e.g., through a sensor) the bleed air conduit in the FFLZ. For purposes of illustration, the present disclosure will be described with respect to a drain assembly for a turbine engine, specifically an unducted turbine engine. It will be understood, however, that aspects of the disclosure described herein are not so limited and can have general applicability within other engines or within other portions of the turbine engine. For example, the disclosure can have applicability for a drain assembly in other engines or vehicles, and can be used to provide benefits in industrial, commercial, and residential applications.

As used herein, the "fire zone" of a turbine engine refers to a legally designated area of the turbine engine that is required to include systems to detect and distinguish fires. The fire zone can include various systems or components that if exposed to an unchecked fire can cause failure of the turbine engine. An "unchecked fire" is an unplanned or undesired fire that is not distinguished or otherwise diminished by the system used to detect and distinguish fires. The fire zone can include, or example, an engine core of the turbine engine, an accessory power unit of the turbine engine, any fuel burning heater or accessory to a combustion section, and any line carrying flammable fuels or gases.

As used herein, the "FFLZ" of a turbine engine refers to a legally designated area of the turbine engine that does not include an ignition source. An ignition source can include, for example, an igniter. It will be appreciated that the FFLZ is an area where both electrical equipment (e.g., engine controllers, sensors, wires, etc.) and flammable liquid lines (e.g., bleed air conduits, fuel lines, etc.) overlap. Specifically, the engine controller includes sensors that are coupled to respective portions of the flammable liquid lines within the FFLZ to measure at least one of a pressure, temperature, or velocity of the liquid within the flammable liquid lines. The FFLZ is designated as such in order to ensure that if leakage of flammable liquids from the flammable liquid lines does occur within the FFLZ, that ignition of the flammable liquids will not occur as there are no ignition sources within the FFLZ.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "axial" and "longitudinal" both refer to a direction parallel to a centerline axis of an object, while the terms "radial" or "radially" refer to a direction that is perpendicular to the axial direction or away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be another suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc-Read Only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10. Specifically, the fan section 18 extends radially outward from the nacelle 40. The fan section 18 includes a set of fan blades 42, and a set of fan vanes 82 downstream the set of fan blades 42, both disposed radially from and circumferentially about the engine centerline 12. The set of fan blades 42 and the set of fan vanes 82 extend radially outward from respective portions of the nacelle 40. As such, the set of fan blades 42 and the set of fan vanes 82 can be defined as an exterior set of fan blades and an exterior set of fan vanes 82, respectively. The unducted turbine engine 10 includes any number of one or more sets of rotating blades or propellers (e.g., the set of fan blades 42) disposed upstream of the set of fan vanes 82. As a non-limiting example, the unducted turbine engine 10 can include multiple sets of fan blades 42 or stationary fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft 48 disposed coaxially about the engine centerline 12 of the unducted turbine engine 10 drivingly connects the HP turbine 34 to the HP compressor 26. An LP shaft 50, which is disposed coaxially about the engine centerline 12 of the unducted turbine engine 10 within the larger diameter annular HP shaft 48, drivingly connects the LP turbine 36 to the LP compressor 24 and fan 20. The HP and LP shafts 48, 50 are rotatable about the engine centerline 12 and coupled to a set of rotatable elements, which collectively define a rotor 51.

It will be appreciated that the unducted turbine engine 10 is either a direct drive or integral drive engine utilizing a reduction gearbox coupling the LP shaft 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP shafts 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP shafts 48, 50, with each stage having a dedicated disk 71. The static turbine vanes 72, 74 for a stage of the turbine section 32 are mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor 51 refers to the combination of rotating elements throughout the unducted turbine engine 10.

Complementary to the rotary portions, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

It will be appreciated that the unducted turbine engine 10 can be split into at last two separate portions; a rotor portion and a stator portion. The rotor portion can be defined as any portion of the unducted turbine engine 10 that rotates about a respective rotational axis. the stator portion can be defined by a combination of non-rotating elements provided within the unducted turbine engine 10. As a non-limiting example, the rotor portion can include the plurality of fan blades 42, the compressor blades 56, 58, or the turbine blades 68, 70. As a non-limiting example, the stator portion can include the plurality of fan vanes 82, the static compressor vanes 60, 62, or the static turbine vanes 72, 74.

The unducted turbine engine 10 is split into zones designated by the risk of a fire occurring in said zone. As a non-limiting example, the unducted turbine engine 10 includes a fire zone 118 that includes at least the engine core 44. The unducted turbine engine 10 includes an FFLZ 164. While illustrated as being exterior the engine core 44, it will be appreciated that the FFLZ 164 is provided within any suitable area of the unducted turbine engine 10. As a non-limiting example, the FFLZ 164 includes the engine casing 46.

The unducted turbine engine 10 includes an engine controller 112 having a processor and a memory. The engine controller 112 or processor can be operably or communicatively coupled to various portions of the unducted turbine engine 10 and be configured to operate the various portions. As a non-limiting example, the engine controller 112 can include a sensor 114. The sensor 114 is used to measure at least one of a pressure, velocity, temperature, or combination thereof of a flow of fluid within a respective portion of the unducted turbine engine 10. The engine controller 112 can control a respective portion of the unducted turbine engine 10 based on the measurements from the sensor 114.

The engine controller 112 is provided within the FFLZ 164. It is contemplated that the placement of the engine controller 112 is selected to avoid over heating of the engine controller 112. Specifically, during operation of the unducted turbine engine 10, the engine core 44 generates a heat through compression of a working airflow and combustion of gases within the unducted turbine engine 10. The heat generated through operation of the unducted turbine engine 10 can, in some cases, damage the engine controller 112 if the engine controller 112 is left exposed to the heat. Positioning the engine controller 112 within the FFLZ 164 and exterior the fire zone 118 locates the engine controller 112 in a spot where the heat from the unducted turbine engine 10 will not overly heat and damage the engine controller 112. The engine controller 112 can be any suitable engine controller such as, but not limited to, a full authority digital engine or electronics controller (FADEC).

The unducted turbine engine 10 includes a set of bleed air conduits 102 fluidly coupled to respective portions of the unducted turbine engine 10. As a non-limiting example, the bleed air conduit 102 can be fluidly coupled to the fan section 18, the compressor section 22, or a combination thereof. The set of bleed air conduits 102 are any suitable conduit, duct, tube, pathway, or the like, which are used to divert bleed air from one location and to another. As a non-limiting example, at least one bleed air conduit of the set of bleed air conduits 102 can feed a bleed air to a downstream or auxiliary portion 110 of the turbine engine. The downstream or auxiliary portion 110 portion can be any downstream portion(s) of the unducted turbine engine 10 (e.g., the combustion section 28, the turbine section 32, etc.), auxiliary system(s) (e.g., a generator, starter, etc.), or a combination thereof.

As a non-limiting example, at least one bleed air conduit of the set of bleed air conduits 102 can feed a bleed air to a respective portion of the engine controller 112. As a non-limiting example, the bleed air within at least one bleed air conduit of the set of bleed air conduits 102 can be fed to the sensor 114 to measure at least one of a pressure, a velocity, a temperature, or a combination thereof of the bleed air provided within the respective bleed air conduit of the set of bleed air conduits 102. There can be any number of one or more bleed air conduits of the set of bleed air conduits 102.

The unducted turbine engine 10 includes a set of drain assemblies 100. Each drain assembly of the set of drain assemblies 100 includes a drain conduit 104. Each drain assembly of the set of drain assemblies 100 is coupled to at least one respective bleed air conduit of the set of bleed air conduits 102 at a junction 120. Each junction 120 is provided within the fire zone 118 such that at least a portion of each drain assembly of the set of drain assemblies 100 is provided within the fire zone 118. It is contemplated that each drain assemblies of the set of drain assemblies 100 is coupled to a single one, or multiple bleed air conduits of the set of bleed air conduits 102. As a non-limiting example, a single drain assembly of the set of drain assemblies 100 can be coupled to two or more bleed air conduits of the set of bleed air conduits 102. There can be any number of one or more drain assemblies of the set of drain assemblies 100.

The drain conduit 104 extends through a respective portion of the fire zone 118 and exhausts exterior the fire zone 118. As a non-limiting example, the drain conduit 104 exhausts to an area that is exterior the nacelle 40. The drain assembly 100 is provided upstream of where the engine controller 112 is coupled to a respective bleed air conduit of the set of bleed air conduits 102 with respect to a flow of fluid within the respective bleed air conduit of the set of bleed air conduits 102.

The turbine engine includes a pylon 84. The pylon 84 mounts the unducted turbine engine 10 to an exterior structure (e.g., a fuselage of an aircraft, a wing, a tail wing, etc.).

During operation of the unducted turbine engine 10, a freestream airflow 80 flows against a forward portion of the unducted turbine engine 10. A first portion of the freestream airflow 80 flows along the nacelle 40 and over the set of fan vanes 82 as an exterior airflow 78. The exterior airflow 78 flows past the set of fan vanes 82, following the curvature of the nacelle 40 and toward the exhaust section 38. A second portion of the freestream airflow 80 enters an annular area 25 defined by a swept area between an outer surface of the nacelle 40 and the tip of the fan blade 42, with this air flow being a working airflow 76.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP shaft 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The working airflow 76 and at least some of the exterior airflow 78 merge downstream of the exhaust section 38 of the unducted turbine engine 10. The working airflow 76 and the exterior airflow 78, together, form an overall thrust of the unducted turbine engine 10.

It is contemplated that the unducted turbine engine 10 draws working air from upstream portions as a flow of bleed air. As non-limiting example, a first flow of bleed air (Fb1) can be drawn from the HP compressor 26, a second flow of bleed air (Fb2) can be drawn from the LP compressor 24, and a third flow of bleed air (Fb3) can be drawn from the fan section 18. Each flow of bleed air is used for a specific purpose. As a non-limiting example, the first flow of bleed air (Fb1) and the second flow of bleed air (Fb2) can be fed to a respective portion of the engine controller 112 to measure the pressure, velocity, temperature, or combination thereof of the first flow of bleed air (Fb1) and the second flow of bleed air (Fb2), respectively. The measurement of the pressure, velocity and/or temperature of the first flow of bleed air (Fb1) and the second flow of bleed air (Fb2) can be used to determine the temperature, velocity and/or pressure of a fluid from where the first flow of bleed air (Fb1) or the second flow of bleed air (Fb2), respectively, is drawn from. As a non-limiting example, the third flow of bleed air (Fb3) can be fed to the downstream or auxiliary portion 110 of the unducted turbine engine 10 to cool a downstream portion of the unducted turbine engine 10.

The temperature of the working airflow 76 exiting the combustor 30 is significantly increased with respect to the working airflow 76 within the compressor section 22, or the freestream airflow 80 that flows over the set of fan blades 42. As such, cooling provided by the third flow of bleed air (Fb3) is necessary for operating of such engine components in heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

It will be appreciated that the illustrated locations of where the first flow of bleed air (Fb1), the second flow of bleed air (Fb2), and the third flow of bleed air (Fb3) are shown to be drawing bleed air from are non-limiting examples. The unducted turbine engine 10 includes any number of one more bleed air conduits of the set of bleed air conduits 102 that draw bleed air from any suitable portion of the unducted turbine engine 10. As a non-limiting example, compressor bleed air from the compressor section 22 can be drawn at an exit of or otherwise a farthest downstream portion of the compressor section 22.

While only the first flow of bleed air (Fb1), the second flow of bleed air (Fb2), and the third flow of bleed air (Fb3) are illustrated, it will be appreciated that the unducted turbine engine 10 can include any number of one or more flows of bleed air. For purposes of reference, the first flow of bleed air (Fb1), the second flow of bleed air (Fb2), the third flow of bleed air (Fb3), or any other suitable flow of bleed air will hereinafter be referred to as the flow of bleed air.

As the flow of bleed air is drawn from a fluid that is, ultimately, derived from exterior the unducted turbine engine 10 (e.g., the freestream airflow 80), the flow of bleed air can contain a water content. The water content of the flow of bleed air is based on a humidity of the freestream airflow 80. As the flow of bleed air flows through a respective bleed air conduit of the set of bleed air conduits 102, the water content within the flow of bleed air can condense and form water droplets within the respective bleed air conduit of the set of bleed air conduits 102. The set of drain assemblies 100 are used to drain the condensation and exhaust it exterior the fire zone 118 as a flow of drainage fluid (Fd).

The junction 120 is provided upstream of the FFLZ 164; specifically, upstream of the engine controller 112 and the sensor 114. The positioning of the junction 120 as upstream of the FFLZ ensures that condensation within the respective bleed air conduit of the set of bleed air conduits 102 is drained from the system prior to flow of bleed air being fed to the engine controller 112. It is contemplated that direct contact between the condensation and the electronics of the engine controller 112 can cause failure of certain portions of the engine controller 112.

Locating the junction 120 within the fire zone 118, ensures that the moisture within the flow of bleed air is at a temperature sufficient to form condensation. Further, locating the junction 120 within the fire zone 118 ensures that the condensation does not freeze within the set of drain assemblies 100.

Locating the coupling (e.g., a location where the sensor 114 is located within or along the set of bleed air conduits 102) of the engine controller 112 as close as possible to and downstream of the junction 120 reduces a pressure drop associated with the flow of bleed air within the set of bleed air conduits 102. The reduction of the pressure drop, in turn, ensures that the measured pressure, velocity, temperature, or combination thereof of the flow of bleed air is closer to the pressure, velocity, temperature, or combination thereof of the working airflow that the flow of bleed air is drawn from. Locating the coupling of the engine controller 112 as close as possible to the junction 120 further reduces the footprint of the set of bleed air conduits 102, thus reducing the space required within the unducted turbine engine 10 for the set of bleed air conduits 102.

When the flow of bleed air within the set of bleed air conduits 102 is fed to a respective sensor 114, the flow of bleed air within the bleed air conduit 102 can be exhausted to atmosphere or diverted back into the unducted turbine engine 10 after passing through or past the sensor 114. The purpose of the sensor 114, as discussed herein, is to measure the temperature, velocity, pressure, or combination thereof of the bleed air within the respective bleed air conduit. If the only purpose of the bleed air conduit 102 is to feed the flow of bleed air to the sensor 114, the bleed air conduit 102 is defined as a sensing conduit.

Figure 2:
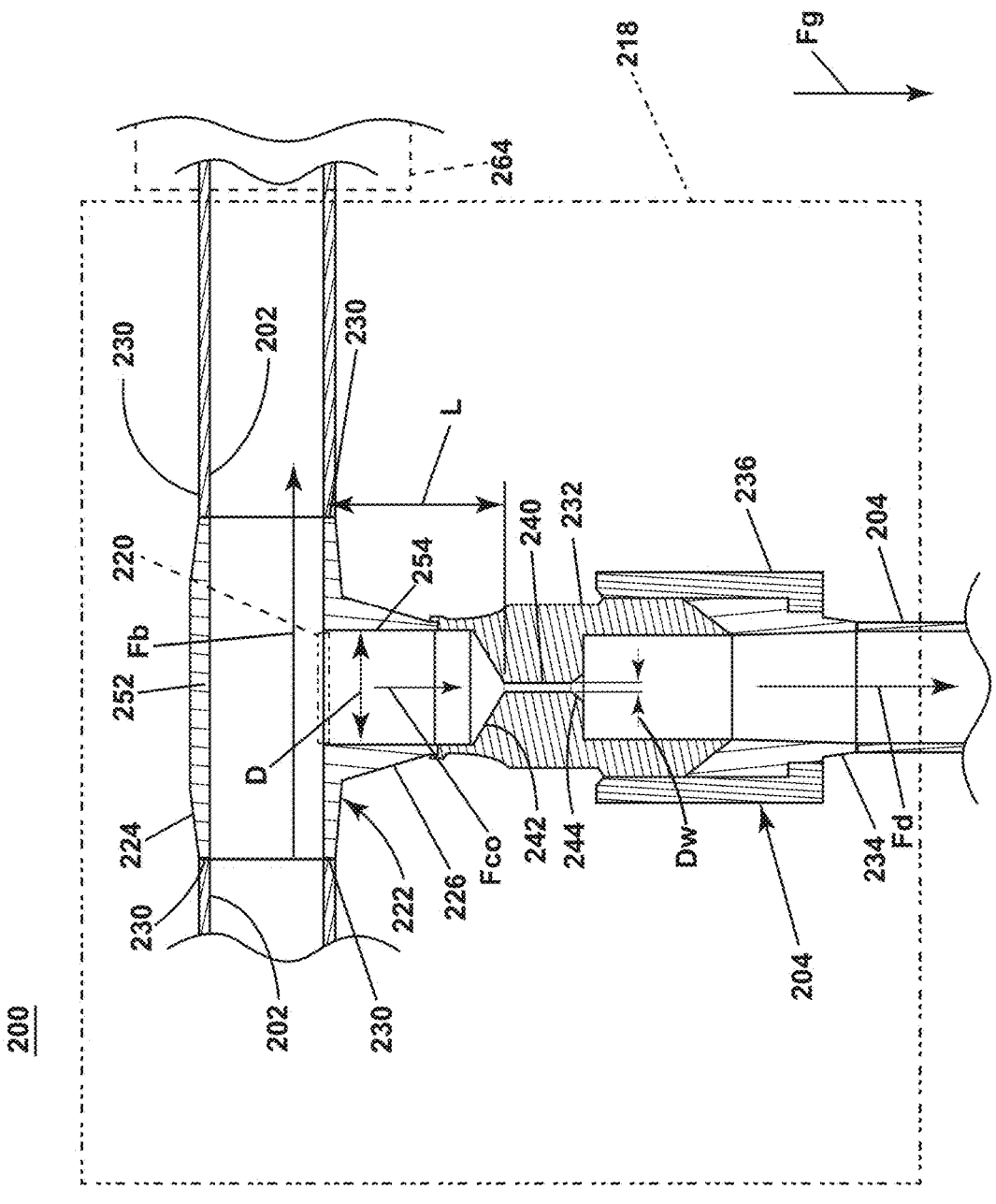
FIG. 2 is a schematic illustration of a drain assembly fluidly coupled to a bleed air conduit suitable for use within the unducted turbine engine of FIG. 1, the drain assembly having a drain conduit, a junction fitting, and a weep hole fitting coupled to the junction fitting.

FIG. 2 is a schematic illustration of a drain assembly 200 fluidly coupled to a bleed air conduit 202 suitable for use within the unducted turbine engine 10 of FIG. 1. The drain assembly 200 and the bleed air conduit 202 are similar to the drain assembly 100 (FIG. 1) and the bleed air conduit 102 (FIG. 1), respectively; therefore, like parts will be identified with like numerals increased to the 200 series with it being understood that the description of the drain assembly 100 and the bleed air conduit 102 applies to the drain assembly 200 and the bleed air conduit 202, respectively, unless noted otherwise.

The bleed air conduit 202 and the drain assembly 200 are provided within a turbine engine (e.g., the unducted turbine engine 10 of FIG. 1). The turbine engine includes a fire zone 218 and an FFLZ 264. At least a portion of the bleed air conduit 202 and the drain assembly 200 are provided within the fire zone 218. The bleed air conduit 202 feeds into the FFLZ 264. The drain assembly 200 is provided along a respective portion of the bleed air conduit 202. The drain assembly 200 includes a drain conduit 204 that opens at a drain outlet (not shown) into an area exterior the fire zone 218.

The bleed air conduit 202 fluidly couples a flow of bleed air (Fb) from an upstream section of the turbine engine to a downstream or auxiliary portion of the turbine engine. The flow of bleed air (Fb) can be any suitable flow of bleed air such as, but not limited to, the first flow of bleed air (Fb1) of FIG. 1, the second flow of bleed air (Fb2) of FIG. 1, the third flow of bleed air (Fb3) of FIG. 1, or any other suitable flow of bleed air. A flow of drainage fluid (Fd) flows through the drain assembly 200 and ultimately to the area exterior the fire zone 218.

The drain assembly 200 is fluidly coupled to a respective portion of the bleed air conduit 202 at a junction 220. The junction 220 is within the fire zone 218. The junction 220 is upstream of the FFLZ 264. The junction 220 is defined as a 3-dimensional area where a passage leading to the drain conduit 204 meets with the bleed air conduit 202. The drain assembly 200 includes a junction fitting 222, a weep hole fitting 232, and the drain conduit 204.

The junction fitting 222 includes the junction 220. The junction fitting 222 is any suitable fitting including, but not limited to, a T-junction fitting, a Y-junction fitting, or the like. As a non-limiting example, the junction fitting 222 is a T-junction fitting including a stem 226 and a top 224 extending transverse the stem 226. The top 224 includes a first internal passage 252. The stem includes a second internal passage 254. The junction 220 is defined as the region where the second internal passage 254 is fluidly coupled to and meets the first internal passage 252. The first internal passage 252 is defined as a continuation of the bleed air conduit 202. As such, at least a portion of the drain assembly 200 defines a respective portion of the bleed air conduit 202. The second internal passage 254 can be defined as a continuation of or otherwise a start of a passage ultimately leading to the drain conduit 204. The second internal passage 254 is defined by a maximum diameter (D).

The drain assembly 200 is integrally formed with or coupled to the bleed air conduit 202 via the junction fitting 222. When being coupled to the bleed air conduit 202, transitions 230 are formed between the body of the junction fitting 222 and the body of the bleed air conduit 202. The drain assembly 200 can be retrofitted to a bleed air conduit 202 that has already been manufactured or already connected (e.g., installed) within a respective turbine engine. As such, the drain assembly 200 can be defined as a retrofit drain assembly. The bleed air conduit 202 can be coupled to the drain assembly 200 through the junction fitting 222 at the transitions 230 through any suitable coupling method such as, but not limited to, welding, adhesion, bonding, fastening, or the like. Alternatively, the junction fitting 222 can be integrally formed with the bleed air conduit 202.

The weep hole fitting 232 includes a weep hole 240. The weep hole 240 includes a weep hole diameter (Dw). The weep hole diameter (Dw) is the smallest diameter of a fluid passage within the weep hole fitting 232. As such, the weep hole 240 defines a portion of the drain assembly 200 with a decreased diameter.

The weep hole 240 can define an inlet to the drain conduit 204. The weep hole fitting 232 can include a funnel 242 defining an inlet to the weep hole 240. The weep hole fitting 232 can include an expander 244. The expander 244 defines a portion of the weep hole 240 of an increasing cross-sectional area from the weep hole diameter (Dw). The expander 244 is used to prevent surface tension along the weep hole 240, thus preventing the retention of a significant amount of water along the surfaces of the weep hole 240.

A positioning of the weep hole 240 with respect to the junction 220 is defined by a length (L). The length (L) is a minimum straight-line distance between a start of the weep hole 240 (e.g., where the funnel 242 meets the weep hole 240) and a nearest point of the junction 220 to the start of the weep hole 240. A ratio between the length (L) and the maximum diameter (D) is used to define a volume of the area between the junction 220 and the weep hole 240. As a non-limiting example, the ratio of the length (L) to the diameter (D) (e.g., an L/D ratio) is greater than or equal to 4 and less than or equal to 8.

The drain assembly 200 can include a connection fitting 236 extending between the weep hole fitting 232 and the drain conduit 204. The connection fitting 236 is separately formed from the weep hole fitting 232 and the drain conduit 204. The connection fitting 236 can be any suitable fitting such as, but not limited to, a nipple fitting. The connection fitting 236 can be coupled to the weep hole fitting 232 and the drain conduit 204 through any suitable method such as, but not limited to, welding, adhesion, fastening, threading, or a combination thereof. As a non-limiting example, the connection fitting 236 can be fastened to the weep hole fitting 232 and the drain conduit 204 through use of a connector 234. The connector 234 is at least partially encased by the connection fitting 236 and is coupled to (e.g., through welding, adhesion, fastening, threading, etc.) respective portions of the weep hole fitting 232 and the drain conduit 204.

While illustrated as including the connection fitting 236 and the connector 234, it will be appreciated that the connection fitting 236, the connector 234, or both the connection fitting 236 and the connector 234 can be excluded from the drain assembly 200. As such, the weep hole fitting 232 can be directly coupled to (e.g., contacts) or is otherwise integrally formed with the drain conduit 204.

The weep hole fitting 232 is coupled to the junction fitting 222 through any suitable coupling method such as, but not limited to, welding, adhesion, fastening, threading, or a combination thereof. Alternatively, the weep hole fitting 232 can be integrally formed with the junction fitting 222.

During operation, the flow of bleed air (Fb) is fed through the bleed air conduit 202 and through first internal passage 252 of the junction fitting 222. A flow of condensation (Fco) flows through the second internal passage 254 and pools into an area between the junction 220 and the weep hole 240. The flow of condensation (Fco) flows through the weep hole 240 and into the drain conduit 204 as the flow of drainage fluid (Fd).

The drain assembly 200 is oriented such that the flow of condensation (Fco) flows into the area between the junction 220 and the weep hole 240 due to gravitational forces illustrated by arrow (Fg). The reduced cross-sectional area of the weep hole 240 discourages the flow of bleed air (Fb) from flowing into the second internal passage 254 and into the weep hole 240.

A volume of the flow of condensation (Fco), and thus the amount of condensation that pools within the area between the junction 220 and the weep hole 240, varies based on the operation of the turbine engine. As a non-limiting example, a turbine engine that is operating in a humid climate will have a more humid flow of bleed air (Fb), and thus a larger volume of condensation from the flow of condensation (Fco), than a turbine engine that is operating in an arid or less humid environment.

The length (L), and the maximum diameter (D) are selected based on the anticipated maximum volume of condensation from the flow of condensation (Fco). As a non-limiting example, if a larger volume of condensation is anticipated, a larger length (L), a larger maximum diameter (D), or a combination thereof can be selected. Put another way, the length (L) and the maximum diameter (D) are selected to form an adequate space for condensation to pool and ensure that the condensation does not overflow past the junction 220 and to downstream portions of the bleed air conduit 202.

Figure 3:
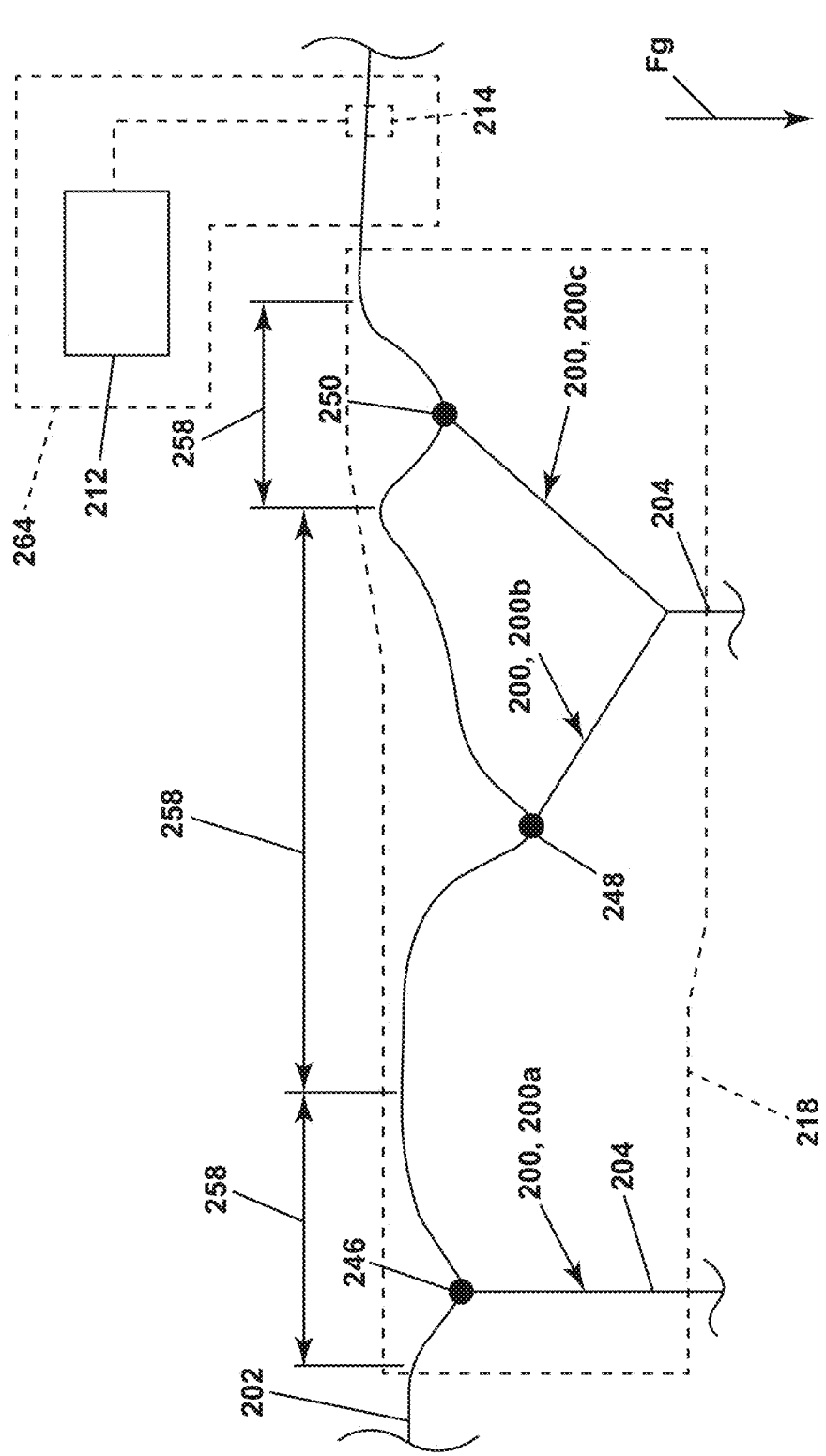
FIG. 3 is a schematic representation of the bleed air conduit of FIG. 3, further illustrating a plurality of drain assemblies.

FIG. 3 is a schematic representation of the bleed air conduit 202 of FIG. 2. The drain assembly 200 can be included within a set of drain assemblies 200 provided along the bleed air conduit 202. Each drain assembly of the set of drain assemblies 200 is provided within the fire zone 218 and upstream of the FFLZ 264 or otherwise where an engine controller 212 is coupled to the bleed air conduit 202. As a non-limiting example, the engine controller 212 can be coupled to the bleed air conduit 202 through a sensor 214.

The set of drain assemblies 200 can include any number of one or more drain assemblies 200. As a non-limiting example, the set of drain assemblies 200 can include a first drain assembly 200a, a second drain assembly 200b, and a third drain assembly 200c provided along a single bleed air conduit 202. The first drain assembly 200a can be coupled to the bleed air conduit 202 at a first junction 246. The second drain assembly 200b can be coupled to the bleed air conduit 202 at a second junction 248. The third drain assembly 200c can be coupled to the bleed air conduit 202 at a third junction 250.

Two or more drain assemblies of the set of drain assemblies 200 can include a common (eg., singular) drain conduit 204. As a non-limiting example, the second drain assembly 200b and the third drain assembly 200c can extend from the second junction 248 and the third junction 250, respectively, and to a singular, common drain conduit 204. It will be appreciated that the second junction 248 and the third junction 250 can be located along the same bleed air conduit 202, as illustrated. Alternatively, the second junction 248 can be provided along the bleed air conduit 202 while the second junction 250 can be provided along another bleed air conduit separate from the bleed air conduit 202.

The bleed air conduit 202 includes a set of valleys 258. Each of the first junction 246, the second junction 248, the third junction 250, or any other junction 220 is provided within a gravitational low point of a respective valley of the set of valleys 258. As used herein, a "gravitational low point" refers to a portion of the respective valley of the set of valleys 258 that is as the minimum or lowest point with respect to the force of gravity (Fg). The positioning of the first junction 246, the second junction 248, the third junction 250, or any other junction 220 (FIG. 2) at a gravitational low point ensures that the condensation from the flow of bleed air (Fb) (FIG. 2) will flow into the respective drain conduit 204. Each valley of the set of valleys 258 includes a single junction 220. Alternatively, two or more junctions 220 can be provided within a single valley of the set of valleys 258.

Figure 4:
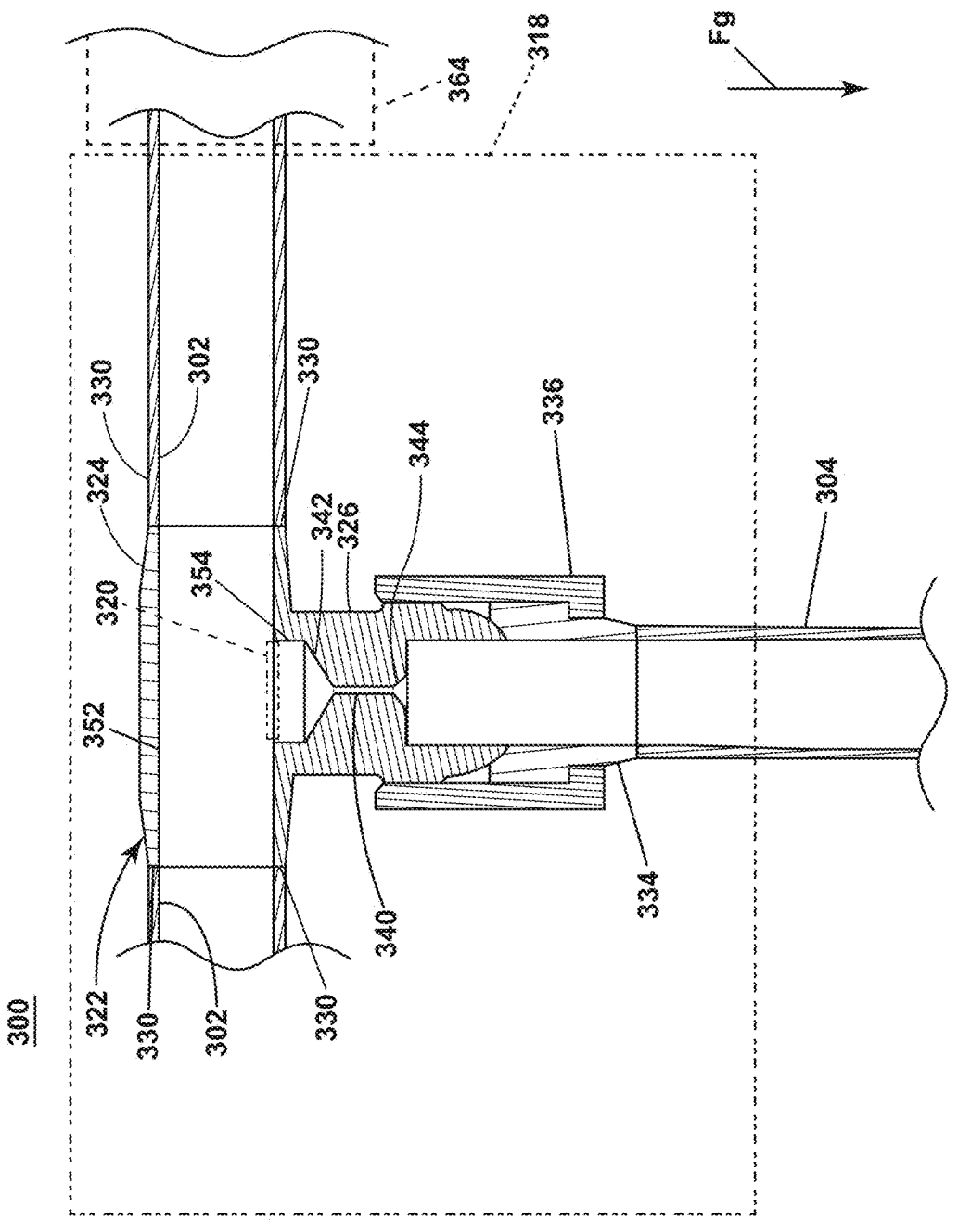
FIG. 4 is a schematic illustration of an exemplary drain assembly fluidly coupled to a bleed air conduit suitable for use within the unducted turbine engine of FIG. 1, the exemplary drain assembly having a drain conduit, a junction fitting, the junction fitting having a weep hole.

FIG. 4 is a schematic illustration of an exemplary drain assembly 300 fluidly coupled to a bleed air conduit 302 suitable for use within the unducted turbine engine 10 of FIG. 1. The drain assembly 300 and the bleed air conduit 302 are similar to the drain assembly 100 (FIG. 1), 200 (FIG. 2) and the bleed air conduit 102 (FIG. 1), 202 (FIG. 2), respectively; therefore, like parts will be identified with like numerals increased to the 300 series with it being understood that the description of the drain assembly 100, 200 and the bleed air conduit 102, 202 applies to the drain assembly 300 and the bleed air conduit 302, respectively, unless noted otherwise.

At least a portion of each of the bleed air conduit 302 and the drain assembly 300 is provided within a fire zone 318 of a turbine engine (e.g., the unducted turbine engine 10 of FIG. 1). The turbine engine further includes an FFLZ 364. The drain assembly 300 is provided along a respective portion of the bleed air conduit 302. The drain assembly 300 is fluidly coupled to a respective portion of the bleed air conduit 302 at a junction 320. The drain assembly 300 includes a junction fitting 322 including the junction 320, a first internal passage 352, and a second internal passage 354. The junction fitting 322 is coupled to or integrally formed with the bleed air conduit 302 at transitions 330. The junction fitting 322 can be any suitable fitting such as, but not limited to, a T-fitting having a stem 326 and a top 324. The drain assembly 300 includes a drain conduit 304 that opens at a drain outlet (not shown) into an area exterior the fire zone 318. The drain assembly includes a connection fitting 336 and a connector 334 securing at least the connection fitting 336 to the drain conduit 304. The junction fitting 322 is provided along a portion of the drain assembly 300 that ensures condensation from a flow of bleed air (e.g., the flow of bleed air (Fb) of FIG. 2) will flow into the drain conduit 304 through gravitational forces designated by arrow (Fg). The junction 320 is provided within the fire zone 318. The junction 320 is upstream of the FFLZ 364.

The drain assembly 300 is similar to the drain assembly 200 in that the drain assembly 300 includes a weep hole 340 fluidly coupling the second internal passage 354 to a respective portion of the drain assembly 300 (e.g., the connection fitting 336). The weep hole 340 is provide within the fire zone 318. The drain assembly 300 includes a funnel 342 defining an inlet to the weep hole 340, and an expander 344. The weep hole 340, unlike the weep hole 240 (FIG. 2), is formed within the junction fitting 322. In other words, the junction fitting 322 is a fitting that includes the first internal passage 352, the second internal passage 354, the junction 320, the funnel 342, the weep hole 340, and the expander 344. The use of the junction fitting 322 that includes the weep hole 340 eliminates the need for a physical coupling between a weep hole fitting (e.g., the weep hole fitting 232 of FIG. 2) and the junction fitting 322, thus reducing the complexity of the drain assembly 300.

The junction fitting 322 is coupled directly to the connection fitting 336 via the connector 334. While illustrated as including the connection fitting 336 and the connector 334, it will be appreciated that the connection fitting 336, the connector 334, or both the connection fitting 336 and the connector 334 can be excluded from the drain assembly 300 such that the junction fitting 322 is directly coupled to (e.g., contacts) the drain conduit 304.

Figure 5:
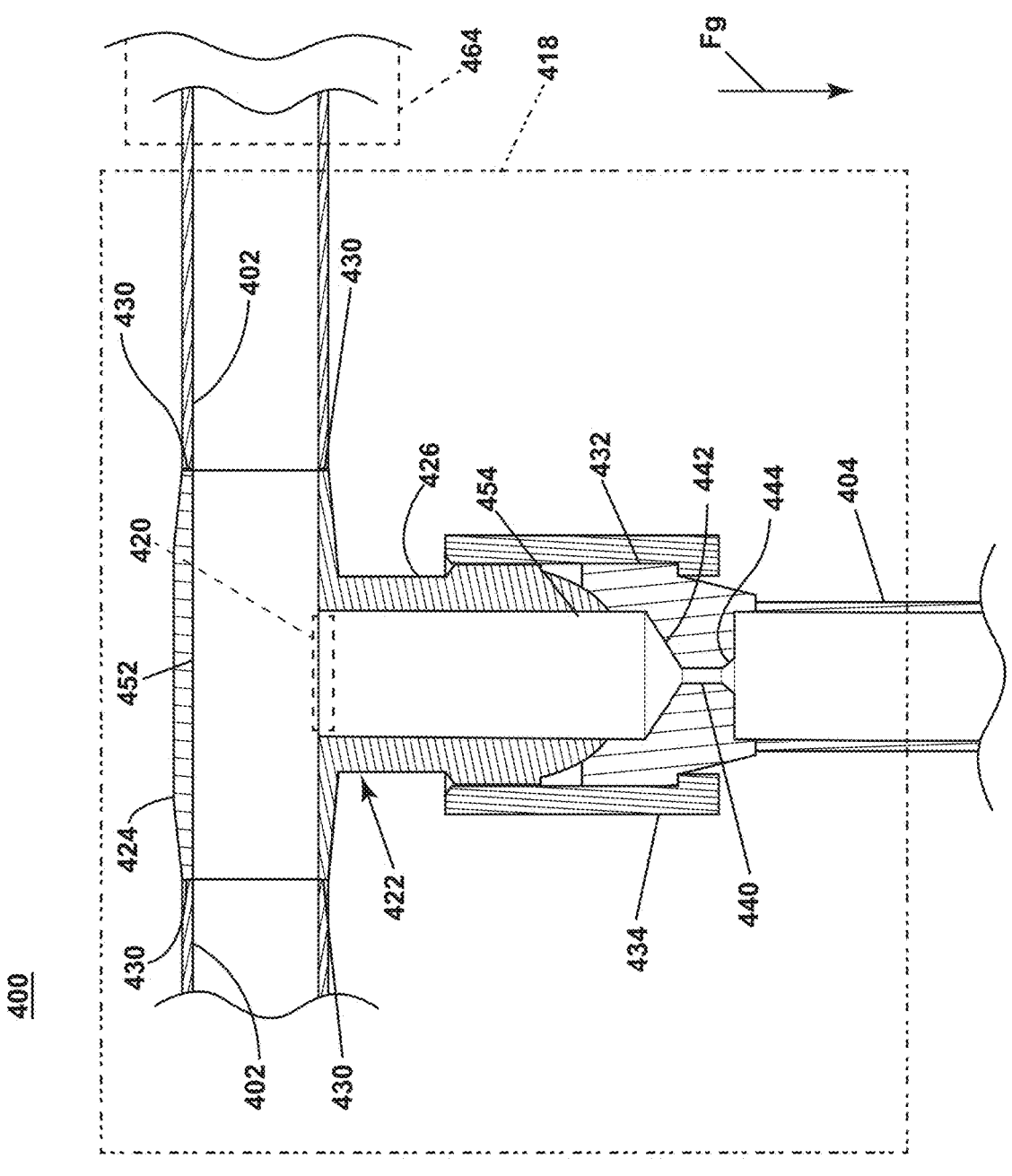
FIG. 5 is a schematic illustration of an exemplary drain assembly fluidly coupled to a bleed air conduit suitable for use within the unducted turbine engine of FIG. 1, the exemplary drain assembly having a drain conduit, a junction fitting, and a weep hole fitting threadedly coupled to the junction fitting.

FIG. 5 is a schematic illustration of an exemplary drain assembly 400 fluidly coupled to a bleed air conduit 402 suitable for use within the unducted turbine engine 10 of FIG. 1. The drain assembly 400 and the bleed air conduit 402 is similar to the drain assembly 100 (FIG. 1), 200 (FIG. 2), 300 (FIG. 4) and the bleed air conduit 102 (FIG. 1), 202 (FIG. 2), 302 (FIG. 4), respectively; therefore, like parts will be identified with like numerals increased to the 400 series with it being understood that the description of the drain assembly 100, 200, 300 and the bleed air conduit 102, 202, 302 applies to the drain assembly 400 and the bleed air conduit 402, respectively, unless noted otherwise.

At least a portion of each of the bleed air conduit 402 and the drain assembly 400 is provided within a fire zone 418 of a turbine engine (e.g., the unducted turbine engine 10 of FIG. 1). The turbine engine includes an FFLZ 464. The drain assembly 400 is provided along a respective portion of the bleed air conduit 402. The drain assembly 400 is fluidly coupled to a respective portion of the bleed air conduit 402 at a junction 420. The drain assembly 400 includes a junction fitting 422 including the junction 420, a first internal passage 452, and a second internal passage 454. The junction fitting 422 is coupled to or integrally formed with the bleed air conduit 402 at transitions 430. The junction fitting 422 can be any suitable fitting such as, but not limited to, a T-fitting having a stem 426 and a top 424. The drain assembly 400 includes a drain conduit 404 that opens at a drain outlet into an area exterior the fire zone 418. The junction fitting 422 is provided along a portion of the drain assembly 400 that ensures condensation from a flow of bleed air (e.g., the flow of bleed air (Fb) of FIG. 2) will flow into the drain conduit 404 through gravitational forces designated by arrow (Fg). The junction 420 is provided within the fire zone 418. The junction 420 is upstream of the FFLZ 464.

The drain assembly 400 is similar to the drain assembly 200 in that the drain assembly 400 includes a weep hole fitting 432 having a weep hole 440. The weep hole fitting 432 is provided within the fire zone 418. The weep hole fitting 432, like the weep hole fitting 232 (FIG. 2), includes a funnel 442 and an expander 444 and is coupled to the junction fitting 422 through a connection fitting 434. The weep hole fitting 432, however, is directly coupled to (e.g., contacts) the drain conduit 404 through any suitable method such as, but not limited to, welding, adhesion, fastening, threading or the like. As a non-limiting example, the weep hole fitting 432 is a B-nut threadedly coupled to the drain conduit 404. The use of the drain assembly 400 eliminates the need for a connector (e.g., the connector 234 (FIG. 2), 334 (FIG. 4)), thus reducing the complexity of the drain assembly 400 and decreasing the burden of manufacturing the drain assembly 400.

Figure 6:
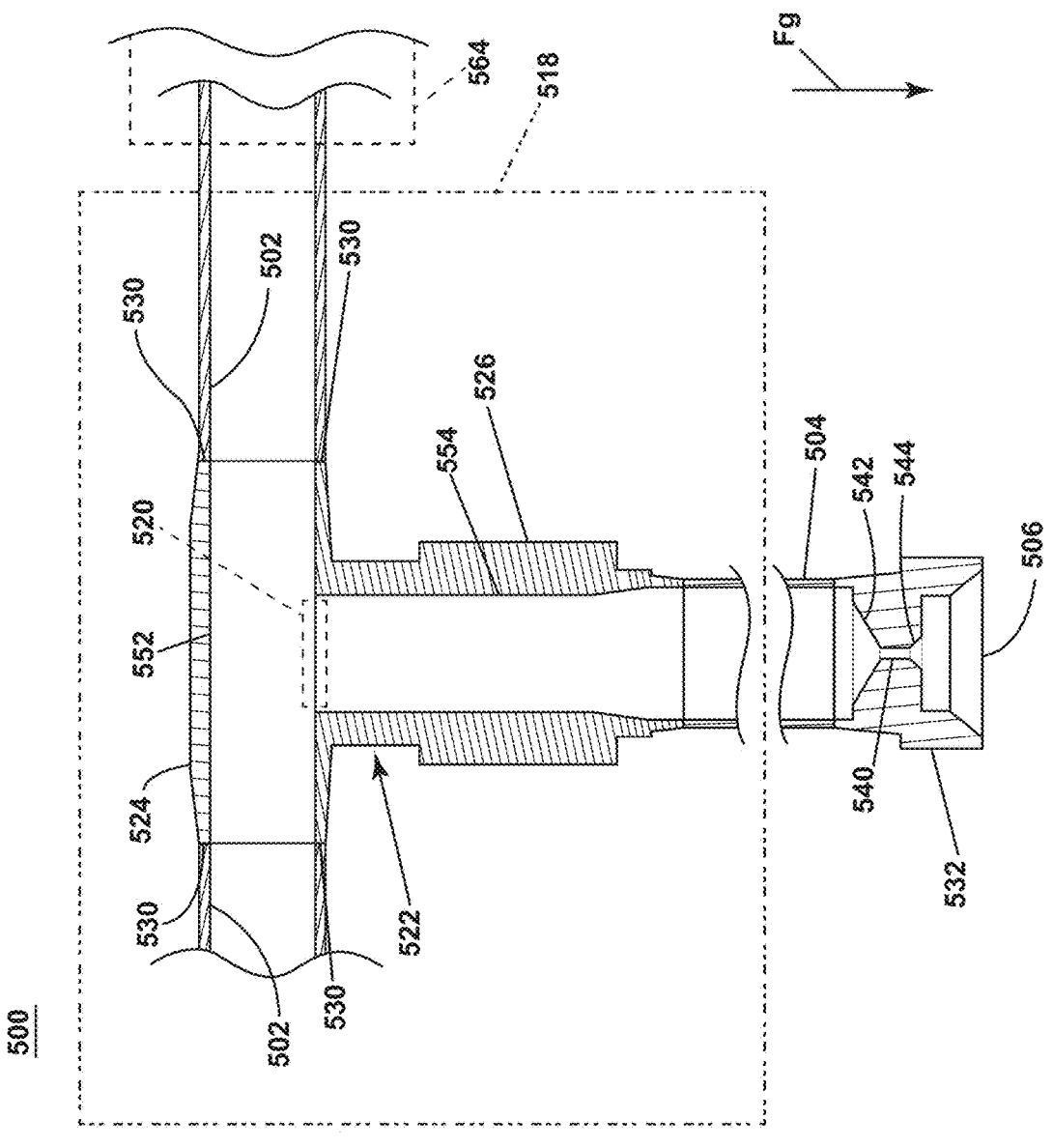
FIG. 6 is a schematic illustration of an exemplary drain assembly fluidly coupled to a bleed air conduit suitable for use within the unducted turbine engine of FIG. 1, the exemplary drain assembly having a drain conduit, a junction fitting, and a weep hole fitting defining an outlet of the drain assembly.

FIG. 6 is a schematic illustration of an exemplary drain assembly 500 fluidly coupled to a bleed air conduit 502 suitable for use within the unducted turbine engine 10 of FIG. 1. The drain assembly 500 and the bleed air conduit 502 are similar to the drain assembly 100 (FIG. 1), 200 (FIG. 2), 300 (FIG. 4), 400 (FIG. 5) and the bleed air conduit 102 (FIG. 1), 202 (FIG. 2), 302 (FIG. 5), 402 (FIG. 5), respectively; therefore, like parts will be identified with like numerals increased to the 500 series with it being understood that the description of the drain assembly 100, 200, 300, 400 and the bleed air conduit 102, 202, 302, 402 applies to the drain assembly 500 and the bleed air conduit 502, respectively, unless noted otherwise.

At least a portion of each of the bleed air conduit 502 and the drain assembly 500 is provided within a fire zone 518 of a turbine engine (e.g., the unducted turbine engine 10 of FIG. 1). The turbine engine includes an FFLZ 564. The drain assembly 500 is provided along a respective portion of the bleed air conduit 502. The drain assembly 500 is fluidly coupled to a respective portion of the bleed air conduit 502 at a junction 520. The drain assembly 500 includes a junction fitting 522 including the junction 520, a first internal passage 552, and a second internal passage 554. The junction fitting 522 is coupled to or integrally formed with the bleed air conduit 502 at transitions 530. The junction fitting 522 can be any suitable fitting such as, but not limited to, a T-fitting having a stem 526 and a top 524. The junction 520 is provided within the fire zone 518. The junction 520 is upstream of the FFLZ 564.

The drain assembly 500, like the drain assembly 200, 400 includes a weep hole fitting 532 including a weep hole 540, a funnel 542 and an expander 544. The weep hole fitting 532, however, is at least partially provided in an area exterior the fire zone 518. As a non-limiting example, the weep hole fitting 532 is provided entirely within the area exterior the fire zone 518. The weep hole fitting 532 includes a drain outlet 506 that opens directly into the area exterior the fire zone 518. The junction fitting 522 is provided along a portion of the drain assembly 500 that ensures condensation from a flow of bleed air (e.g., the flow of bleed air (Fb) of FIG. 2) will flow into the drain conduit 504 through gravitational forces designated by arrow (Fg).

The weep hole fitting 532 is coupled the drain conduit 504 through any suitable method such as, but not limited to, welding, adhesion, fastening, threading, or the like. The drain conduit 504 is coupled the junction fitting 522 through any suitable method such as, but not limited to, welding, adhesion, fastening, threading, or the like.

The drain assembly 500 includes a larger area between the weep hole 540 and the junction 520. As such, the drain assembly 500 includes a larger area to hold condensation with respect to the drain assembly 200, 300, 400. It is contemplated that the drain assembly 500 can be used in turbine engines that are anticipated to be used within high-humidity regions or otherwise within regions where a larger volume of condensation is anticipated.

Figure 7:
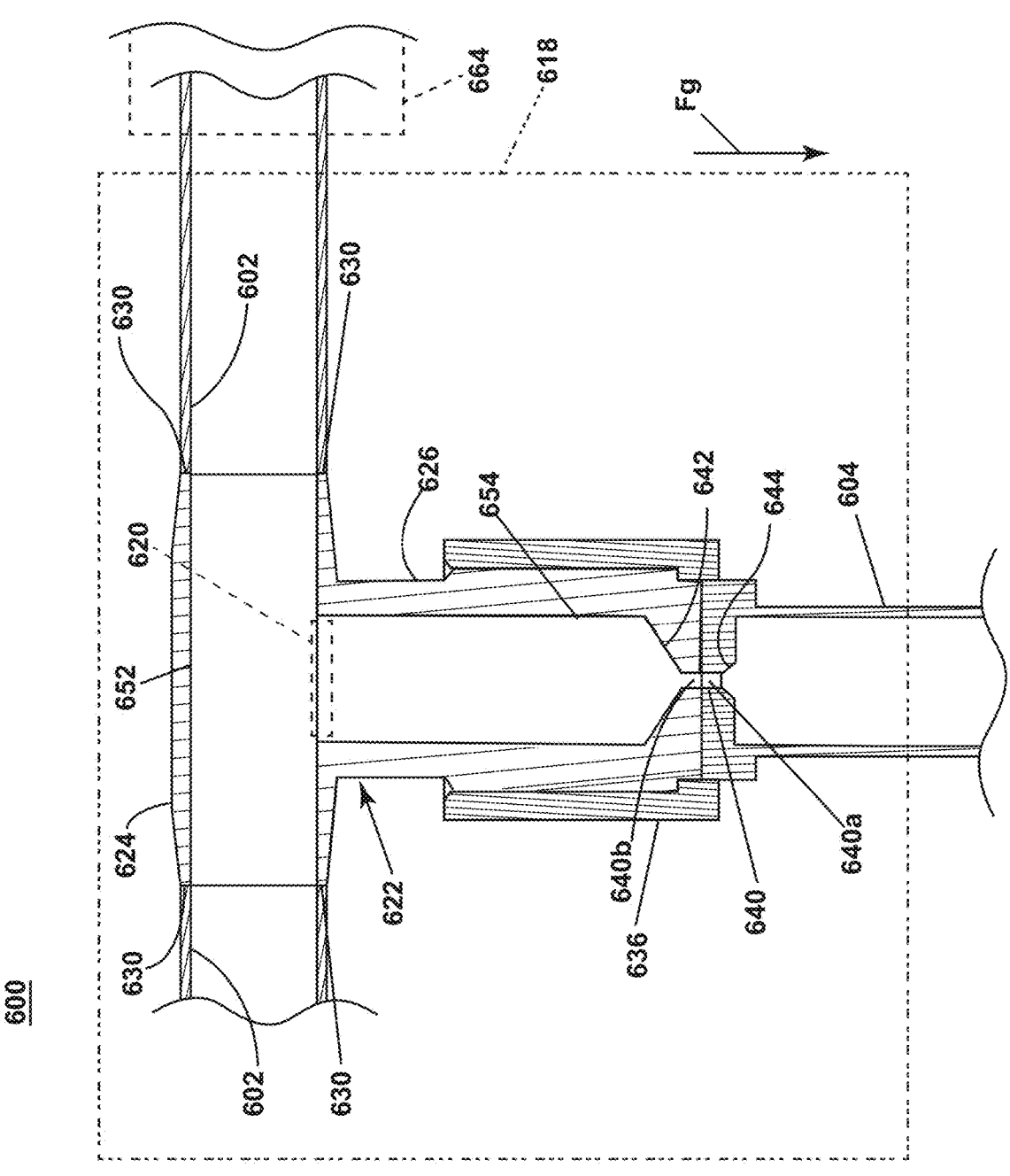
FIG. 7 is a schematic illustration of an exemplary drain assembly fluidly coupled to a bleed air conduit suitable for use within the unducted turbine engine of FIG. 1, the exemplary drain assembly having a drain conduit, a junction fitting, and a weep hole formed by both the drain conduit and the junction fitting.

FIG. 7 is a schematic illustration of an exemplary drain assembly 600 fluidly coupled to a bleed air conduit 402 suitable for use within the unducted turbine engine 10 of FIG. 1. The drain assembly 600 and the bleed air conduit 602 are similar to the drain assembly 100 (FIG. 1), 200 (FIG. 2), 300 (FIG. 4), 400 (FIG. 5), 500 (FIG. 6) and the bleed air conduit 102 (FIG. 1), 202 (FIG. 2), 302 (FIG. 4), 402 (FIG. 5), 502 (FIG. 6), respectively; therefore, like parts will be identified with like numerals increased to the 600 series with it being understood that the description of the drain assembly 100, 200, 300, 400, 500 and the bleed air conduit 102, 202, 302, 402, 502 applies to the drain assembly 600 and the bleed air conduit 602, respectively, unless noted otherwise.

At least a portion of each of the bleed air conduit 602 and the drain assembly 600 is provided within a fire zone 618 of a turbine engine (e.g., the unducted turbine engine 10 of FIG. 1). The turbine engine includes an FFLZ 664. The drain assembly 600 is provided along a respective portion of the bleed air conduit 602. The drain assembly 600 is fluidly coupled to a respective portion of the bleed air conduit 602 at a junction 620. The drain assembly 600 includes a junction fitting 622 including the junction 620, a first internal passage 652, and a second internal passage 654. The junction fitting 622 is coupled to or integrally formed with the bleed air conduit 602 at transitions 630. The junction fitting 622 can be any suitable fitting such as, but not limited to, a T-fitting having a stem 626 and a top 624. The drain assembly 600 includes a drain conduit 604 that opens at a drain outlet (not shown) into an area exterior the fire zone 618. The junction fitting 622 is provided along a portion of the drain assembly 600 that ensures condensation from a flow of bleed air (e.g., the flow of bleed air (Fb) of FIG. 2) will flow into the drain conduit 604 through gravitational forces designated by arrow (Fg). The junction 620 is provided within the fire zone 618. The junction 620 is upstream of the FFLZ 664.

The drain assembly 600, like the drain assembly 100, 200, 300, 400, 500 includes a weep hole 640, a funnel 642 and an expander 644. The weep hole 640, however, includes a first portion 640a formed within or otherwise formed by the junction fitting 622 (e.g., similar to the weep hole 340 of FIG. 4) and a second portion 640b formed within or otherwise formed by the drain conduit 604. As a non-limiting example, the expander 644 and at least the second portion of the weep hole 640 are formed by the drain conduit 604, while the funnel 642 and the first portion of the weep hole 640 are formed by the junction fitting 622. Alternatively, all of the weep hole 640 can be formed by one of either the junction fitting 622 or the drain conduit 604. The splitting of the weep hole 640 between the junction fitting 622 and the drain conduit 604 allows for design variations within the weep hole 640. For example, if it is later desired to add in a larger expander 644, only the drain conduit 604 need to be replaced rather than an entirety of the weep hole 640.

With the configuration of the drain assembly 600, the drain conduit 604 directly contacts the junction fitting 622. A connection fitting 636 couples the drain conduit 604 to the junction fitting 622. The connection fitting 636 can be any suitable connector. Alternatively, the drain conduit 604 can be coupled to the junction fitting 622 through the coupling methods such as, but not limited to, welding or adhesion.

Figure 8:
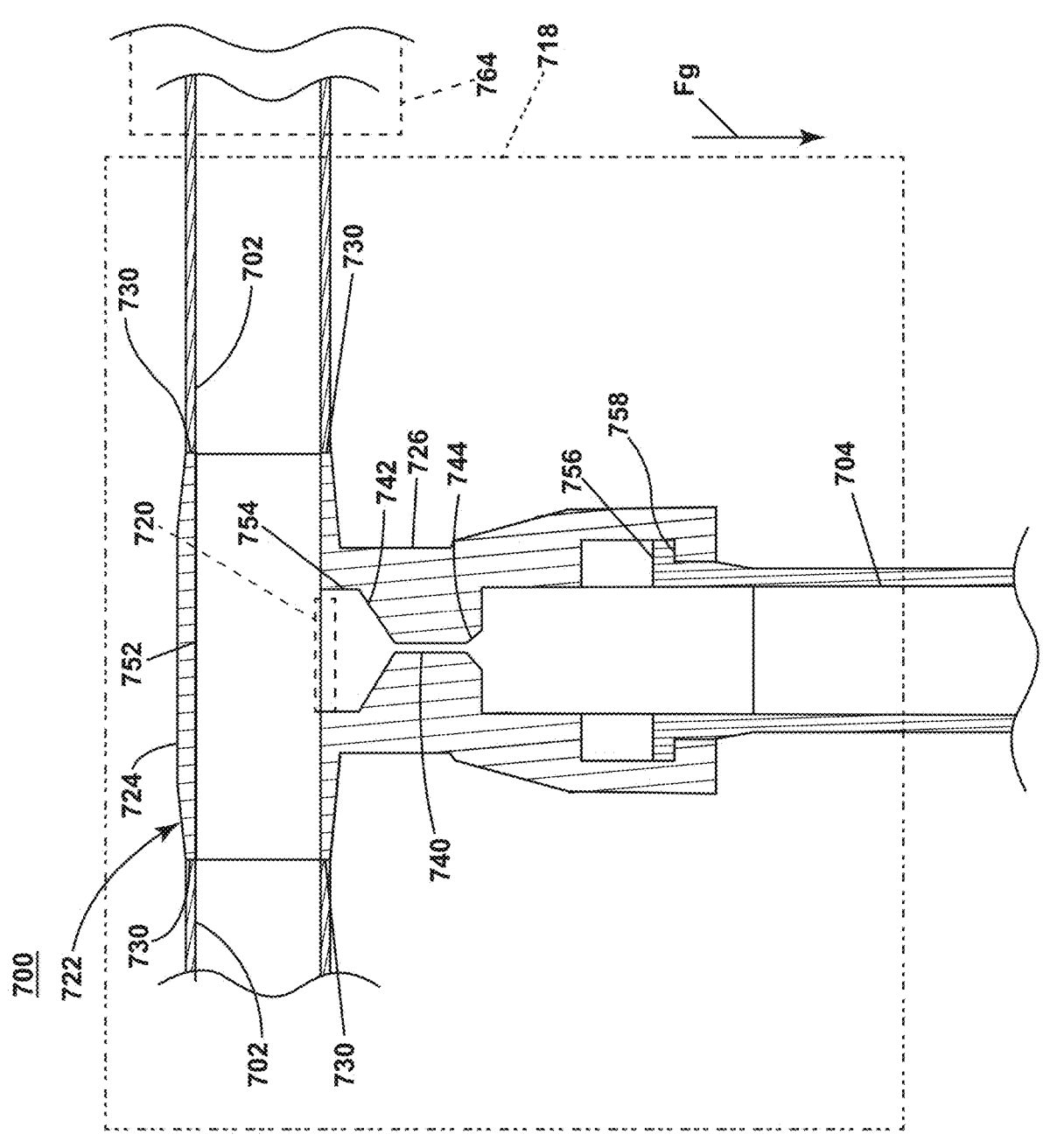
FIG. 8 is a schematic illustration of an exemplary drain assembly fluidly coupled to a bleed air conduit suitable for use within the unducted turbine engine of FIG. 1, the exemplary drain assembly having a drain conduit, a junction fitting, a weep hole, a lip and a seat.

FIG. 8 is a schematic illustration of an exemplary drain assembly 700 fluidly coupled to a bleed air conduit 402 suitable for use within the unducted turbine engine 10 of FIG. 1. The drain assembly 700 and the bleed air conduit 702 are similar to the drain assembly 100 (FIG. 1), 200 (FIG. 2), 300 (FIG. 4), 400 (FIG. 5), 500 (FIG. 6), 600 (FIG. 7) and the bleed air conduit 102 (FIG. 1), 202 (FIG. 2), 302 (FIG. 4), 402 (FIG. 5), 502 (FIG. 6), 602 (FIG. 7), respectively; therefore, like parts will be identified with like numerals increased to the 700 series with it being understood that the description of the drain assembly 100, 200, 300, 400, 500, 600 and the bleed air conduit 102, 202, 302, 402, 502, 602 applies to the drain assembly 700 and the bleed air conduit 702, respectively, unless noted otherwise.

At least a portion of each of the bleed air conduit 702 and the drain assembly 700 is provided within a fire zone 718 of a turbine engine (e.g., the unducted turbine engine 10 of FIG. 1). The turbine engine includes an FFLZ 764. The drain assembly 700 is provided along a respective portion of the bleed air conduit 702. The drain assembly 700 is fluidly coupled to a respective portion of the bleed air conduit 702 at a junction 720. The drain assembly 700 includes a junction fitting 722 including the junction 720, a first internal passage 752, and a second internal passage 754. The junction fitting 722 is coupled to or integrally formed with the bleed air conduit 702 at transitions 730. The junction fitting 722 can be any suitable fitting such as, but not limited to, a T-fitting having a stem 726 and a top 724. The drain assembly 700 includes a drain conduit 704 that opens at a drain outlet (not shown) into an area exterior the fire zone 718. The junction fitting 722 is provided along a portion of the drain assembly 700 that ensures condensation from a flow of bleed air (e.g., the flow of bleed air (Fb) of FIG. 2) will flow into the drain conduit 704 through gravitational forces designated by arrow (Fg). The junction 720 is provided within the fire zone 718. The junction 720 is upstream of the FFLZ 764.

The drain assembly 700, like the drain assembly 200 includes a weep hole 740, a funnel 742 and an expander 744 formed within the junction fitting 722. The junction fitting 722 is coupled to the drain conduit 704 through use of a lip 756 and a seat 758. The lip 756 is a projection that is sized to sit against or otherwise be received within the seat 758. The lip 756 and the seat 758 can be provided along any suitable portion of the drain assembly 700. As a non-limiting example, the lip 756 can be provided along the drain conduit 704 while the seat 758 can be provided along the junction fitting 722. During assembly, the drain conduit 704 can be compressed inwardly via a force (e.g., compression from a hand or tool) and inserted into the junction fitting 722. Once the force is removed, the drain conduit 704 expands and the lip 756 is received within the seat 758.

While described in terms of the junction fitting 722 including the seat 758, additional assemblies are contemplated. As a non-limiting example, a connection fitting (e.g., the connection fitting 234 (FIG. 1), 334 (FIG. 4)) including the seat 758 or the lip 756 can be threaded onto or otherwise coupled to the junction fitting 722. As a non-limiting example, a weep hole fitting (e.g., the weep hole fitting 232 (FIG. 2), 432 (FIG. 5)) including the seat 758 or the lip 756 can be threaded onto or otherwise coupled to the junction fitting 722. The drain conduit 704 including an other of the lip 756 or the seat 758 can then be coupled to the connection fitting or the weep hole fitting effectively coupling the drain conduit 704 to the junction fitting 722. An opposite configuration where the connector is threaded to the drain conduit 704 and the junction fitting includes one of either the lip 756 or the seat 758 is contemplated.

The use of the lip 756 and the seat 758 allows for a decrease burden of manufacture. Further, the coupling created by the lip 756 and the seat 758 is reversible. Put another way, the drain conduit 704, when the lip 756 is provided within the seat 758, can be compressed again and removed from the junction fitting 722.

Figure 9:
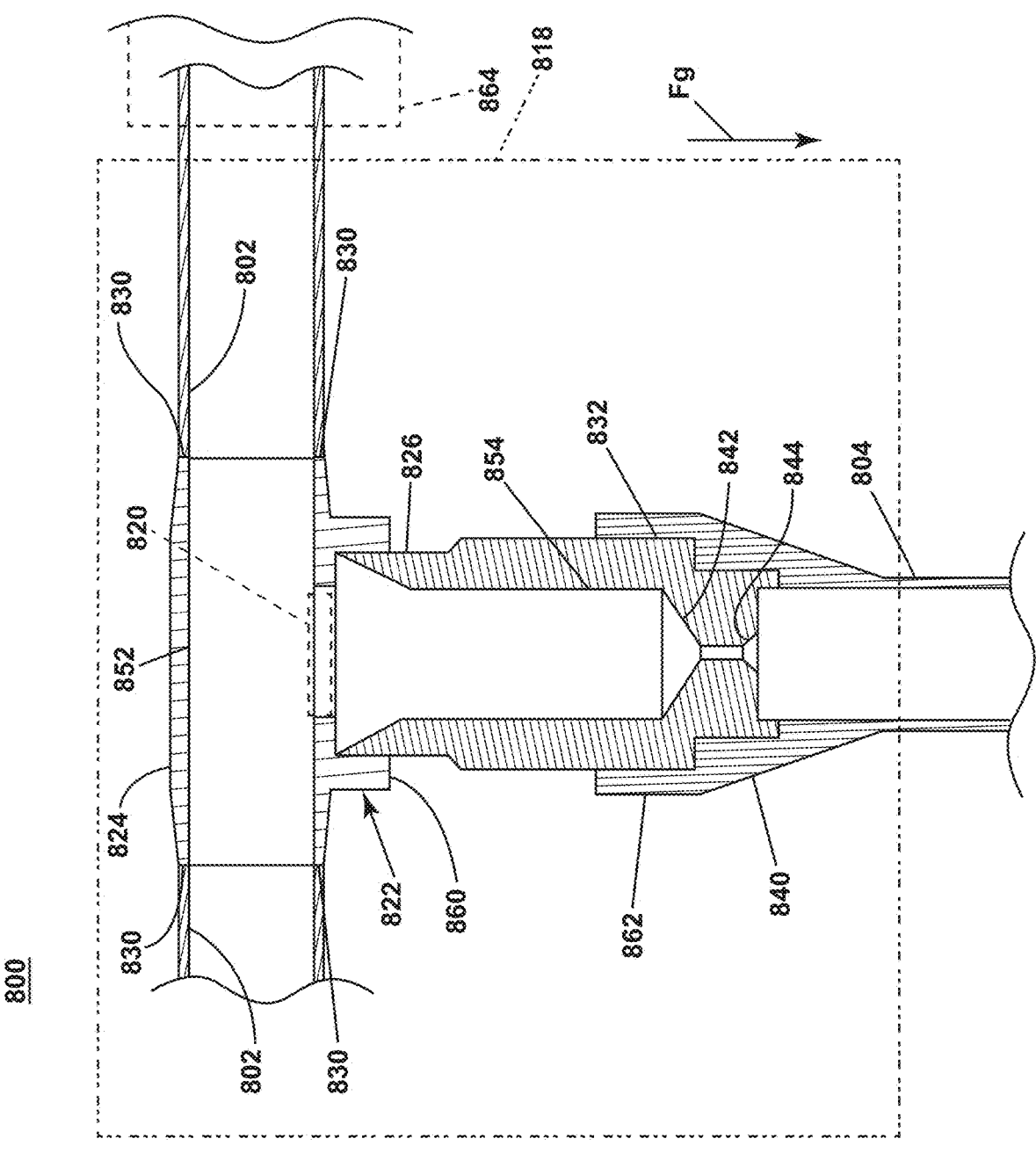
FIG. 9 is a schematic illustration of an exemplary drain assembly fluidly coupled to a bleed air conduit suitable for use within the unducted turbine engine of FIG. 1, the exemplary drain assembly having a drain conduit, a junction fitting, and a weep hole fitting threaded to the drain conduit and the junction fitting.

FIG. 9 is a schematic illustration of an exemplary drain assembly 800 fluidly coupled to a bleed air conduit 802 suitable for use within the unducted turbine engine 10 of FIG. 1. The drain assembly 800 and the bleed air conduit 802 are similar to the drain assembly 100 (FIG. 1), 200 (FIG. 2), 300 (FIG. 4), 400 (FIG. 5), 500 (FIG. 6), 600 (FIG. 7), 700 (FIG. 8) and the bleed air conduit 102 (FIG. 1), 202 (FIG. 2), 302 (FIG. 4), 402 (FIG. 5), 502 (FIG. 6), 602 (FIG. 7), 702 (FIG. 8), respectively; therefore, like parts will be identified with like numerals increased to the 800 series with it being understood that the description of the drain assembly 100, 200, 300, 400, 500, 600, 700 and the bleed air conduit 102, 202, 302, 402, 502, 602, 702 applies to the drain assembly 800 and the bleed air conduit 802, respectively, unless noted otherwise.

At least a portion of each of the bleed air conduit 802 and the drain assembly 800 is provided within a fire zone 818 of a turbine engine (e.g., the unducted turbine engine 10 of FIG. 1). The turbine engine includes an FFLZ 864. The drain assembly 800 is provided along a respective portion of the bleed air conduit 802. The drain assembly 800 is fluidly coupled to a respective portion of the bleed air conduit 802 at a junction 820. The drain assembly 800 includes a junction fitting 822 including the junction 820, a first internal passage 852, and a second internal passage 854. The junction fitting 822 is coupled to or integrally formed with the bleed air conduit 802 at transitions 830. The junction fitting 822 can be any suitable fitting such as, but not limited to, a T-fitting having a stem 826 and a top 824. The drain assembly 800 includes a drain conduit 804 that opens at a drain outlet (not shown0 into an area exterior the fire zone 818. The junction fitting 822 is provided along a portion of the drain assembly 800 that ensures condensation from a flow of bleed air (e.g., the flow of bleed air (Fb) of FIG. 2) will flow into the drain conduit 804 through gravitational forces designated by arrow (Fg). The junction 820 is provided within the fire zone 818. The junction 820 is upstream of the FFLZ 864.

The drain assembly 800, like the drain assembly 200, 400 includes a weep hole fitting 832 having a weep hole 840, a funnel 842 and an expander 844. The weep hole fitting 832, however, is partially encased by receptive portions of the junction fitting 822 and the drain conduit 804. As a non-limiting example, the junction fitting 822 includes a first protrusion 860 and the drain conduit 804 includes a second protrusion 862. The first protrusion 860 encases (e.g., surrounds) a first portion of the weep hole fitting 832. The second protrusion 862 encases (e.g., surrounds) a second portion of the weep hole fitting 832.

The first protrusion 860 and the second protrusion 862 can each include a series of threads (not illustrated). The weep hole fitting 832 can include a series of threads (not illustrated) opposing the series of threads provided on the first protrusion 860 and the second protrusion 862. The weep hole fitting 832 can be threaded to the junction fitting 822 and the drain conduit 804 through use of the first protrusion 860 and the second protrusion 862. As the weep hole fitting 832 is threaded to the junction fitting 822 and the drain conduit 804, the weep hole fitting 832 is removably coupled to the junction fitting 822 and the drain conduit 804.

The use of the weep hole fitting 832 that is removably coupled to at least one of the junction fitting 822, the drain conduit 804, or a combination thereof allows for a decreased burden in manufacture and maintenance of the drain assembly 800. For example, it is contemplated that using threads to secure the weep hole fitting 832 to respective portions of the drain assembly 800 is easier than welding, adhering, or fastening the weep hole fitting 832 to respective portions of the drain assembly 800; therefore, reducing the burden of manufacture. Further, it is contemplated that threads are easier to disengage than welds, adhesives, or fasteners. Therefore, parts of the drain assembly 800 (e.g., the weep hole fitting 832) can easily be disengaged to be inspected, cleaned, or replaced during maintenance of the drain assembly 800.

Figure 10:
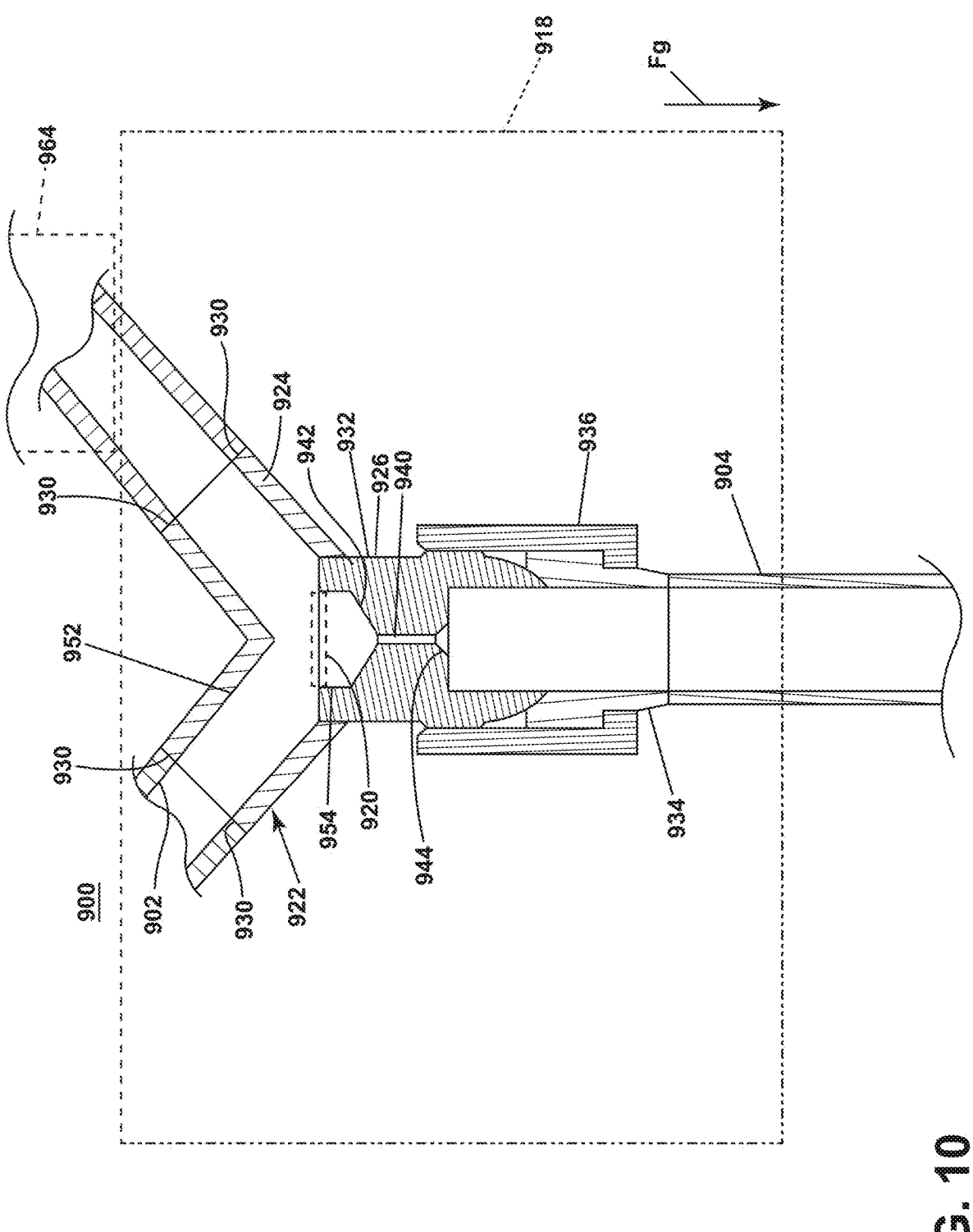
FIG. 10 is a schematic illustration of an exemplary drain assembly fluidly coupled to a bleed air conduit suitable for use within the unducted turbine engine of FIG. 1, the exemplary drain assembly having a drain conduit, a junction fitting, and a weep hole fitting, the junction fitting and the weep hole fitting forming a Y-junction.

FIG. 10 is a schematic illustration of an exemplary drain assembly 900 fluidly coupled to a bleed air conduit 402 suitable for use within the unducted turbine engine 10 of FIG. 1. The drain assembly 900 and the bleed air conduit 902 are similar to the drain assembly 100 (FIG. 1), 200 (FIG. 2), 300 (FIG. 4), 400 (FIG. 5), 500 (FIG. 6), 600 (FIG. 7), 700 (FIG. 8), 800 (FIG. 9) and the bleed air conduit 102 (FIG. 1), 202 (FIG. 2), 302 (FIG. 4), 402 (FIG. 5), 502 (FIG. 6), 602 (FIG. 7), 702 (FIG. 8), 802 (FIG. 9), respectively; therefore, like parts will be identified with like numerals increased to the 900 series with it being understood that the description of the drain assembly 100, 200, 300, 400, 500, 600, 700, 800 and the bleed air conduit 102, 202, 302, 402, 502, 602, 702, 802 applies to the drain assembly 900 and the bleed air conduit 902, respectively, unless noted otherwise.

At least a portion of each of the bleed air conduit 902 and the drain assembly 900 is provided within a fire zone 918 of a turbine engine (e.g., the unducted turbine engine 10 of FIG. 1). The turbine engine includes an FFLZ 964. The drain assembly 900 is provided along a respective portion of the bleed air conduit 902. The drain assembly 900 is fluidly coupled to a respective portion of the bleed air conduit 902 at a junction 920. The drain assembly 900 includes a junction fitting 922 including the junction 920, a first internal passage 952, and a second internal passage 954. The junction fitting 922 is coupled to or integrally formed with the bleed air conduit 902 at transitions 930. The drain assembly 900 includes a drain conduit 904 that opens at a drain outlet (not shown) into an area exterior the fire zone 918. The junction fitting 922 is provided along a portion of the drain assembly 900 that ensures condensation from a flow of bleed air (e.g., the flow of bleed air (Fb) of FIG. 2) will flow into the drain conduit 904 through gravitational forces designated by arrow (Fg). The drain assembly 900 can include a connector 934 coupling a weep hole fitting 932 to the drain conduit 904. The connector 934 and the weep hole fitting 932 can be coupled via a connection fitting 936. The junction 920 is provided within the fire zone 918. The junction 920 is upstream of the FFLZ 964.

The drain assembly 900, like the drain assembly 200, 400, 800 includes a weep hole fitting 932 having a weep hole 940, a funnel 942 and an expander 944. The drain assembly 900, as illustrated, is defined by a Y-junction with a stem 926 and a top 924. The top 924 is defined by the junction fitting 922. The stem 926 can be defined by the weep hole fitting 932 and the drain conduit 904. The junction 920 is provided at a gravitational lowest portion of the top 924.

The use of a Y-junction can, in some instances, reduce the footprint of the drain assembly 900. Further, use of the Y-junction directs the flow of bleed air within the bleed air conduit 902 directly towards the drain assembly 900, thus increasing the likelihood of condensation within the flow of bleed air to enter the drain assembly 900.

With reference to FIGS. 2-10, it will be appreciated that the junction fitting 222, 322, 422, 522, 622, 722, 822, 922 is any suitable junction fitting in which the drain conduit 204, 304, 404, 504, 604, 704, 804, 904 is couplable to a gravitational lowest portion of the junction fitting 222, 322, 422, 522, 622, 722, 822, 922. As a non-limiting example, the junction fitting 222, 322, 422, 522, 622, 722, 822, 922 is a T-junction (FIGS. 2-9), a Y-junction (FIG. 10), or the like. The drain conduit 204, 304, 404, 504, 604, 704, 804, 904 is further coupled to the bleed air conduit 202, 302, 402, 502, 602, 702, 802, 902 or otherwise to the junction fitting 222, 322, 422, 522, 622, 722, 822, 922 through any suitable method such as, but not limited to, welding, adhesion, threading, adhesion, frictional contact, snap fittings, or the like.

Benefits include a turbine engine that is more aerodynamically efficient when compared to the conventional turbine engine. For example, the conventional turbine engine includes a fan casing that houses or otherwise provides a point for coupling the engine controller(s). The engine controller(s) are positioned along the fan casing in order to position et engine controller(s) in an area of the turbine engine that is exterior the fire zone. Positioning the engine controller(s) exterior the fire zone is done to avoid exposing the engine controller(s) to temperatures produced by the turbine engine that exceed the acceptable temperature of the engine controllers (e.g., a temperature at which the engine controller(s) can function). The architecture required to mount the engine controllers to the fan casing, however, require space which affect an aerodynamic profile of the fan casing. The turbine engine, as described herein, however, mounts the engine controller(s) to the engine casing rather than the fan casing, or another exterior portion of the turbine engine (e.g., the nacelle or cowling). As such, additional architecture that negatively impacts the aerodynamic profiles of the turbine engine are not required, thus resulting in a turbine engine having a higher aerodynamic efficiency when compared to the conventional turbine engine.

Positioning the engine controller(s) along the engine casing, however, presents an issue when it comes to draining the condensation from the bleed air conduit(s). In the conventional turbine engine, the bleed air conduit(s) are routed to the area exterior the fire zone and have enough space between the fire zone and the engine controller(s) to provide for the required architecture to drain the condensation from the bleed air conduit(s). The bleed air conduit(s), as described herein, do not have enough space between the engine controller(s) and the fire zone to drain the condensation as the engine controller(s) are positioned along a portion of the engine casing that is near the exterior of the fire zone. As it is undesirable to exhaust the condensation into the fire zone, the drain assembly is used to remove the condensation from the bleed air conduit(s) and exhaust it to an area exterior the fire zone.

Further, positioning the engine controller(s) along the engine casing, reduces the distance between the engine controllers(s) and a location where the bleed air within the bleed air conduit(s) is drawn from. The reduction of the distance between the engine controller(s) and the location where the bleed air within the bleed air conduit(s) is drawn from, in turn, reduces the total distance that the bleed air conduit(s) extend. The reduction of the total distance that the bleed air conduit(s) extend, in turn, reduces the footprint/weight of the bleed air conduit(s) and reduces the pressure drop associated with the bleed air being moved a longer distance within the bleed air conduit(s). The reduction of the pressure drop, in turn, means that the measured pressure, temperature, or combination thereof of the bleed air is more accurate. The more accurate measurements, in turn, mean that the engine controller(s) are able to more effectively ascertain the operational parameters of the turbine engine and adjust the operation of het turbine engine accordingly.

As discussed herein, the size of the fire zone within the unducted turbine engine is larger than the fire zone within, for example, a turbofan turbine engine. The size of the fire zone in the unducted turbine engine makes it economically and physically (e.g., in terms of how much extra space is required) infeasible to divert the bleed air conduit to the area exterior the fire zone to drain the condensation. The drain assembly is fluidly coupled to a portion of the bleed air conduit that is provided within the fire zone. The drain assembly, however, includes the weep hole and the drain conduit that divert the condensation to the area exterior of the fire zone.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure. Further still it will be understood that the specific drain assemblies shown may all be used in a single turbine engine and are not mutually exclusive.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising an engine core comprising a compressor section, combustor section, and turbine section in serial flow arrangement and defining a stator, rotor, and a fire zone, a fan section rotationally coupled to the rotor, a bleed air conduit fluidly coupled to at least one of the fan section or the compressor section and having a gravitational low point within the fire zone, and a drain assembly provided along the bleed air conduit at a junction, the drain assembly including a weep hole fluidly coupled to the gravitational low point, and a drain conduit fluidly coupled to the weep hole and having an outlet exterior the fire zone.

The turbine engine of any preceding clause, wherein the drain assembly comprises a junction fitting including the junction.

The turbine engine of any preceding clause, wherein at least a portion of the weep hole is formed within the junction fitting.

The turbine engine of any preceding clause, wherein the weep hole is provided within a weep hole fitting coupled to the junction fitting.

The turbine engine of any preceding clause, wherein the drain conduit is coupled to the junction fitting through at least one of welding, adhesion, fastening, threading, or a combination thereof.

The turbine engine of any preceding clause, wherein the junction fitting is welded to the bleed air conduit.

The turbine engine of any preceding clause, wherein the junction fitting includes a top including a first internal passage and a stem including a second internal passage fluidly coupled to the first internal passage at the junction, the top extending transverse the stem.

The turbine engine of any preceding clause, wherein at least one bleed air conduit is at least partially defined by the first internal passage.

The turbine engine of any preceding clause, wherein the weep hole is provided within the fire zone.

The turbine engine of any preceding clause, wherein the weep hole is provided outside of the fire zone.

The turbine engine of any preceding clause, further comprising a weep hole fitting and wherein the weep hole fitting defines an outlet of the drain conduit.

The turbine engine of any preceding clause, further comprising a flammable fluid leakage zone (FFLZ) and an engine controller, the bleed air conduit extending into the FFLZ, the engine controller being provided within the FFLZ, and being operably coupled to the bleed air conduit.

The turbine engine of any preceding clause, wherein the engine controller is operably coupled to the bleed air conduit fluidly downstream of the junction.

The turbine engine of any preceding clause, wherein engine controller measures at least one of a temperature, pressure, or combination thereof of a flow of bleed air within the bleed air conduit to determine at least one of a pressure, temperature, or combination thereof of a working airflow from a region of the turbine engine where the flow of bleed air within the bleed air conduit is drawn from.

The turbine engine of any preceding clause, wherein the engine controller is a Full Authority Digital Engine Control (FADEC).

The turbine engine of any preceding clause, wherein the drain assembly is included within a plurality of drain assemblies and the bleed air conduit is included within a plurality of bleed air conduits.

The turbine engine of any preceding clause, wherein at least one drain assembly of the plurality of drain assemblies is fluidly coupled to two or more bleed air conduits of the plurality of bleed air conduits.

The turbine engine of any preceding clause, wherein the drain assembly is fluidly coupled to the bleed air conduit at two or more junctions along the bleed air conduit.

The turbine engine of any preceding clause, further comprising a nacelle encasing the engine core, with the drain conduit exhausting exterior of the nacelle.

The turbine engine of any preceding clause, wherein the fan section includes a plurality of fan blades extending outwardly from the nacelle.

The turbine engine of any preceding clause, wherein the drain assembly comprises a lip and a seat, the lip being receivable within the seat to couple two portions of the drain assembly together.

The turbine engine of any preceding clause, wherein the lip is located along the drain conduit.

The turbine engine of any preceding clause, wherein the drain assembly comprises a weep hole fitting, with the seat being provided along the weep hole fitting.

The turbine engine of any preceding clause, wherein the drain assembly comprises a junction fitting, with the seat being provided along the junction fitting.

The turbine engine of any preceding clause, wherein the weep hole is positioned a length (L) from the junction, the length (L) being defined as a minimum straight-line distance between a start of the weep hole and a nearest portion of the junction, the drain assembly has a junction fitting having a first internal passage and a second internal passage, the second internal passage having a maximum diameter (D).

The turbine engine of any preceding clause, wherein a ratio between the length (L) and the maximum diameter (D) is greater than or equal to 4 and less than or equal to 8.

The turbine engine of any preceding clause, wherein the drain assembly comprises one of a weep hole fitting or a junction fitting having a respective portion of the weep hole, with the drain conduit being threaded to a respective portion of the weep hole fitting or the junction fitting.

The turbine engine of any preceding clause, wherein a first portion of the weep hole is defined by a first structure of the drain assembly, and a second portion of the weep hole is defined by a second structure of the drain assembly.

The turbine engine of any preceding clause, wherein the first structure is a junction fitting and the second structure is the drain conduit.

The turbine engine of any preceding clause, wherein the junction fitting is a T-junction.

The turbine engine of any preceding clause, wherein the junction fitting is a Y-junction.

The turbine engine of any preceding clause, further comprising a connection fitting extending between the junction fitting and the drain conduit.

The turbine engine of any preceding clause, further comprising a connection fitting extending between the weep hole fitting and the drain conduit.

The turbine engine of any preceding clause, further comprising a connector at least partially encasing the connection fitting.

The turbine engine of any preceding clause, wherein the weep hole comprises a funnel at an inlet of the weep hole.

The turbine engine of any preceding clause, further comprising a weep hole fitting and wherein the weep hole fitting defines an outlet of the drain conduit.

The turbine engine of any preceding clause, wherein the turbine engine is an unducted turbine engine.

A unducted turbine engine comprising an engine core comprising a compressor section, combustor section, and turbine section in serial flow arrangement and defining a stator, rotor, and a fire zone, a fan section rotationally coupled to the rotor, a bleed air conduit fluidly coupled to at least one of the fan section or the compressor section and having a gravitational low point within the fire zone, and a drain assembly provided along the bleed air conduit at a junction, the drain assembly including a weep hole fluidly coupled to the gravitational low point, and a drain conduit fluidly coupled to the weep hole and having an outlet exterior the fire zone.

The unducted turbine engine of any preceding clause, wherein the drain assembly comprises a junction fitting including the junction.

The unducted turbine engine of any preceding clause, wherein at least a portion of the weep hole is formed within the junction fitting.

The unducted turbine engine of any preceding clause, wherein the weep hole is provided within a weep hole fitting coupled to the junction fitting.

The unducted turbine engine of any preceding clause, wherein the drain conduit is coupled to the junction fitting through at least one of welding, adhesion, fastening, threading, or a combination thereof.

The unducted turbine engine of any preceding clause, wherein the junction fitting is welded to the bleed air conduit.

The unducted turbine engine of any preceding clause, wherein the junction fitting includes a top including a first internal passage and a stem including a second internal passage fluidly coupled to the first internal passage at the junction, the top extending transverse the stem.

The unducted turbine engine of any preceding clause, wherein at least one bleed air conduit is at least partially defined by the first internal passage.

The unducted turbine engine of any preceding clause, wherein the weep hole is provided within the fire zone.

The unducted turbine engine of any preceding clause, wherein the weep hole is provided outside of the fire zone.

The unducted turbine engine of any preceding clause, wherein the weep hole defines an outlet of the drain conduit.

The unducted turbine engine of any preceding clause, further comprising a flammable fluid leakage zone (FFLZ) and an engine controller, the bleed air conduit extending into the FFLZ, the engine controller being provided within the FFLZ, and being operably coupled to the bleed air conduit.

The unducted turbine engine of any preceding clause, wherein the engine controller is operably coupled to the bleed air conduit fluidly downstream of the junction.

The unducted turbine engine of any preceding clause, wherein engine controller measures at least one of a temperature, pressure, or combination thereof of a flow of bleed air within the bleed air conduit to determine at least one of a pressure, temperature, or combination thereof of a working airflow from a region of the unducted turbine engine where the flow of bleed air within the bleed air conduit is drawn from.

The unducted turbine engine of any preceding clause, wherein the engine controller is a Full Authority Digital Engine Control (FADEC).

The unducted turbine engine of any preceding clause, wherein the drain assembly is included within a plurality of drain assemblies and the bleed air conduit is included within a plurality of bleed air conduits.

The unducted turbine engine of any preceding clause, wherein at least one drain assembly of the plurality of drain assemblies is fluidly coupled to two or more bleed air conduits of the plurality of bleed air conduits.

The unducted turbine engine of any preceding clause, wherein the drain assembly is fluidly coupled to the bleed air conduit at two or more junctions along the bleed air conduit.

The unducted turbine engine of any preceding clause, further comprising a nacelle encasing the engine core, with the drain conduit exhausting exterior of the nacelle.

The unducted turbine engine of any preceding clause, wherein the fan section includes a plurality of fan blades extending outwardly from the nacelle.

The unducted turbine engine of any preceding clause, wherein the drain assembly comprises a lip and a seat, the lip being receivable within the seat to couple two portions of the drain assembly together.

The unducted turbine engine of any preceding clause, wherein the lip is located along the drain conduit.

The unducted turbine engine of any preceding clause, wherein the drain assembly comprises a weep hole fitting, with the seat being provided along the weep hole fitting.

The unducted turbine engine of any preceding clause, wherein the drain assembly comprises a junction fitting, with the seat being provided along the junction fitting.

The unducted turbine engine of any preceding clause, wherein the weep hole is positioned a length (L) from the junction, the length (L) being defined as a minimum straight-line distance between a start of the weep hole and a nearest portion of the junction, the drain assembly has a junction fitting having a first internal passage and a second internal passage, the second internal passage having a maximum diameter (D).

The unducted turbine engine of any preceding clause, wherein a ratio between the length (L) and the maximum diameter (D) is greater than or equal to 4 and less than or equal to 8.

The unducted turbine engine of any preceding clause, wherein the drain assembly comprises one of a weep hole fitting or a junction fitting having a respective portion of the weep hole, with the drain conduit being threaded to a respective portion of the weep hole fitting or the junction fitting.

The unducted turbine engine of any preceding clause, wherein a first portion of the weep hole is defined by a first structure of the drain assembly, and a second portion of the weep hole is defined by a second structure of the drain assembly.

The unducted turbine engine of any preceding clause, wherein the first structure is a junction fitting and the second structure is the drain conduit.

The unducted turbine engine of any preceding clause, wherein the junction fitting is a T-junction.

The unducted turbine engine of any preceding clause, wherein the junction fitting is a Y-junction.

The unducted turbine engine of any preceding clause, further comprising a connection fitting extending between the junction fitting and the drain conduit.

The unducted turbine engine of any preceding clause, further comprising a connection fitting extending between the weep hole fitting and the drain conduit.

The unducted turbine engine of any preceding clause, further comprising a connector at least partially encasing the connection fitting.

The unducted turbine engine of any preceding clause, wherein the weep hole comprises a funnel at an inlet of the weep hole.

The unducted turbine engine of any preceding clause, wherein the weep hole comprises an expander at an outlet of the weep hole.

What is claimed is:

1. A turbine engine comprising:
an engine core comprising
　a compressor section,
　a combustor section, and
　a turbine section in serial flow arrangement and defining a stator, a rotor, and a fire zone;
a fan section rotationally coupled to the rotor;
a bleed air conduit fluidly coupled to at least one of the fan section or the compressor section and having a gravitational low point within the fire zone; and
a drain assembly provided along the bleed air conduit at a junction, the drain assembly including
　a weep hole fluidly coupled to the gravitational low point, an area between the junction and the weep hole in which condensation is configured to pool, and
a drain conduit fluidly coupled to the weep hole and having a drain conduit outlet exterior the fire zone;
wherein the weep hole comprises a funnel at an inlet of the weep hole and an expander at an outlet of the weep hole.

2. The turbine engine of claim 1, wherein the drain assembly comprises a junction fitting including the junction.

3. The turbine engine of claim 2, wherein at least a portion of the weep hole is formed within the junction fitting.

4. The turbine engine of claim 2, wherein the weep hole is provided within a weep hole fitting coupled to the junction fitting.

5. The turbine engine of claim 4, wherein the drain conduit is coupled to the junction fitting through at least one of welding, adhesion, fastening, threading, or a combination thereof.

6. The turbine engine of claim 2, wherein the junction fitting is welded to the bleed air conduit.

7. The turbine engine of claim 2, wherein the junction fitting includes a top including a first internal passage and a stem including a second internal passage fluidly coupled to the first internal passage at the junction, the top extending transverse the stem.

8. The turbine engine of claim 7, wherein the bleed air conduit is at least partially defined by the first internal passage.

9. The turbine engine of claim 1, wherein the weep hole is provided within the fire zone.

10. The turbine engine of claim 1, wherein the weep hole is provided outside of the fire zone.

11. The turbine engine of claim 1, further comprising a weep hole fitting and wherein the weep hole fitting defines the drain conduit outlet.

12. The turbine engine of claim 1, further comprising a flammable fluid leakage zone (FFLZ) and an engine controller, the bleed air conduit extending into the FFLZ, the engine controller being provided within the FFLZ, and being operably coupled to the bleed air conduit.

13. The turbine engine of claim 12, wherein the engine controller is operably coupled to the bleed air conduit fluidly downstream of the junction.

14. The turbine engine of claim 12, wherein the engine controller measures at least one of a temperature, a pressure, or a combination thereof of a flow of bleed air within the bleed air conduit to determine at least one of a pressure, a temperature, or a combination thereof of a working airflow from a region of the turbine engine where the flow of bleed air within the bleed air conduit is drawn from.

15. The turbine engine of claim 12, wherein the engine controller is a Full Authority Digital Engine Control (FADEC).

16. The turbine engine of claim 1, wherein the drain assembly is included within a plurality of drain assemblies and the bleed air conduit is included within a plurality of bleed air conduits.

17. The turbine engine of claim 16, wherein at least one drain assembly of the plurality of drain assemblies is fluidly coupled to two or more bleed air conduits of the plurality of bleed air conduits.

18. The turbine engine of claim 1, wherein the drain assembly is fluidly coupled to the bleed air conduit at two or more junctions along the bleed air conduit.

19. The turbine engine of claim 1, further comprising a nacelle encasing the engine core, with the drain conduit exhausting exterior of the nacelle.

20. The turbine engine of claim 19, wherein the fan section includes a plurality of fan blades extending outwardly from the nacelle.

* * * * *